(12) United States Patent
Patil et al.

(10) Patent No.: US 10,090,999 B2
(45) Date of Patent: *Oct. 2, 2018

(54) GROUP KEY ANNOUNCEMENT AND DISTRIBUTION FOR A DATA LINK GROUP

(71) Applicant: QUALCOMM Incorporated, San Diego, CA (US)

(72) Inventors: Abhishek Pramod Patil, San Diego, CA (US); George Cherian, San Diego, CA (US); Soo Bum Lee, San Diego, CA (US); Jouni Kalevi Malinen, Tuusula (FI); Santosh Paul Abraham, San Diego, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 15/006,881

(22) Filed: Jan. 26, 2016

(65) Prior Publication Data

US 2016/0218865 A1  Jul. 28, 2016

Related U.S. Application Data

(60) Provisional application No. 62/108,374, filed on Jan. 27, 2015, provisional application No. 62/209,326, filed on Aug. 24, 2015.

(51) Int. Cl.
*H04L 29/06* (2006.01)
*H04L 9/08* (2006.01)
(Continued)

(52) U.S. Cl.
CPC .......... *H04L 9/0833* (2013.01); *H04L 9/0822* (2013.01); *H04L 9/0891* (2013.01);
(Continued)

(58) Field of Classification Search
CPC ........................... H04L 9/0833; H04L 63/065
See application file for complete search history.

(56) References Cited

U.S. PATENT DOCUMENTS 6,049,878 A     4/2000   Caronni et al.
6,295,361 B1 *   9/2001   Kadansky ............... H04L 29/06
                                                    380/273

(Continued)

FOREIGN PATENT DOCUMENTS

WO      2009118268 A2    10/2009

OTHER PUBLICATIONS

Definition on term "potential" (Year: 2018).*

(Continued)

*Primary Examiner* — Thaddeus J Plecha
(74) *Attorney, Agent, or Firm* — Steven R. Thiel; Toler Law Group

(57) ABSTRACT

A device for wireless communication includes key logic configured to obtain a candidate group key corresponding to a data link group. The device also includes a wireless interface configured to transmit an announcement message to one or more devices of the data link group during a paging window designated for the data link group. The announcement message includes a multicast message and indicates availability of the candidate group key, and the announcement message.

30 Claims, 10 Drawing Sheets

(51) Int. Cl.
*H04L 9/32* (2006.01)
*H04W 12/04* (2009.01)
*H04W 84/18* (2009.01)

(52) U.S. Cl.
CPC .......... *H04L 9/3242* (2013.01); *H04L 63/061* (2013.01); *H04L 63/062* (2013.01); *H04L 63/065* (2013.01); *H04L 63/068* (2013.01); *H04W 12/04* (2013.01); *H04W 84/18* (2013.01); *H04L 2209/80* (2013.01)

(56) References Cited

U.S. PATENT DOCUMENTS

| | | | |
|---|---|---|---|
| 8,893,267 | B1 | 11/2014 | Sathe et al. |
| 9,801,053 | B1 | 10/2017 | Ziraknejad |
| 2004/0105549 | A1 | 6/2004 | Suzuki et al. |
| 2007/0053354 | A1* | 3/2007 | Rudolf .................. H04L 9/0833 370/389 |
| 2008/0010242 | A1 | 1/2008 | Jin et al. |
| 2008/0175387 | A1 | 7/2008 | Eastham |
| 2010/0208898 | A1* | 8/2010 | Acar .................. H04L 9/0833 380/280 |
| 2011/0080935 | A1 | 4/2011 | Kim et al. |
| 2012/0163600 | A1 | 6/2012 | Kim et al. |
| 2013/0036305 | A1* | 2/2013 | Yadav .................. H04L 63/065 713/168 |
| 2013/0243195 | A1* | 9/2013 | Kruegel ................ H04L 63/065 380/270 |
| 2013/0268654 | A1 | 10/2013 | Abraham et al. |
| 2013/0304938 | A1 | 11/2013 | Hayes et al. |
| 2014/0082185 | A1 | 3/2014 | Abraham et al. |
| 2014/0119543 | A1* | 5/2014 | Yu ........................ H04L 63/068 380/270 |
| 2015/0143108 | A1 | 5/2015 | Demeter et al. |
| 2015/0365835 | A1* | 12/2015 | Segev .................. H04W 8/005 370/252 |
| 2016/0080416 | A1* | 3/2016 | Purohit ................ H04L 12/189 713/151 |
| 2016/0150465 | A1* | 5/2016 | Jung .................... H04W 48/16 370/254 |
| 2016/0183171 | A1 | 6/2016 | Hareuveni et al. |
| 2016/0218866 | A1 | 7/2016 | Patil et al. |
| 2017/0255589 | A1 | 9/2017 | Barber et al. |

OTHER PUBLICATIONS

Definition on term "candidate" (Year: 2018).*
International Search Report and Written Opinion for International Application No. PCT/US2016/015196, ISA/EPO, dated Apr. 4, 2016, 14 pgs.

* cited by examiner

GROUP KEY ANNOUNCEMENT AND DISTRIBUTION FOR A DATA LINK GROUP

I. CROSS REFERENCE TO RELATED APPLICATIONS

The present application claims the benefit of U.S. Provisional Patent Application No. 62/108,374, entitled "GROUP KEY ANNOUNCEMENT AND/OR DISTRIBUTION FOR A GROUP," filed Jan. 27, 2015, and claims the benefit of U.S. Provisional Patent Application No. 62/209,326, entitled "GROUP KEY ANNOUNCEMENT AND DISTRIBUTION FOR A GROUP," filed Aug. 24, 2015, which are expressly incorporated by reference herein in their entirety.

II. FIELD

The present disclosure is generally related to announcement and distribution of a group key.

III. DESCRIPTION OF RELATED ART

Devices included in a data link group of a neighbor aware network (NAN) or a wireless mesh network use a security credential, such as a group key (e.g., a common group key), to encrypt group addressed traffic. For security reasons, a particular group key (e.g., an active group key) used by the devices of the data link group expires after a corresponding time period. Periodically, a new group key is generated and securely distributed to each device of the data link group. To illustrate, a particular device that generates the new group key may send a key announcement message to other devices of the data link group and may send the new group key to one or more devices (e.g., one or more neighboring devices) of the data link group using peer exchange messaging (e.g., point-to-point (P2P) communication). The new group key may be distributed to each device of the data link group using additional association operations and unicast message exchanges between devices in the data link group. Performing association operations or unicast message exchanges to distribute group keys may add significant traffic and overhead to the NAN or the wireless mesh network.

IV. SUMMARY

In a particular aspect, a device includes key logic configured to obtain a candidate group key corresponding to a data link group. The device also includes a wireless interface configured to transmit an announcement message to one or more devices of the data link group during a paging window designated for the data link group. The announcement message includes a multicast message and indicates availability of the candidate group key.

In another particular aspect, a method includes obtaining a candidate group key at a first device of a data link group. The method further includes transmitting, from the first device to a second device of the data link group, an announcement message indicating availability of the candidate group key. The announcement message includes a multicast message and is transmitted during a paging window designated for the data link group.

In a particular aspect, a device includes key logic configured to monitor a first communication channel during a paging window designated for a data link group. The device also includes a wireless interface configured to receive an announcement message from a first device of the data link group during the paging window. The announcement message includes a multicast message and indicates availability of the candidate group key.

In another particular aspect, a method includes monitoring, at a second device of a data link group, a first communication channel during a paging window designated for the data link group. The method further includes receiving an announcement message at the second device from a first device of the data link group during the paging window. The announcement message includes a multicast message and indicates availability of the candidate group key.

In another particular aspect, a device includes key logic configured to obtain a candidate group key corresponding to a data link group. The device also includes a wireless interface configured to transmit an announcement message to one or more devices of the data link group during a discovery window of a first communication channel. The announcement message includes a multicast message and indicates availability of the candidate group key.

In another particular aspect, a method includes obtaining a candidate group key at a first device of a data link group. The method further includes transmitting, from the first device to devices of the data link group, an announcement message indicating availability the candidate group key. The announcement message includes a multicast message and is transmitted during a discovery window and via a first communication channel.

In another particular aspect, a device includes key logic configured to monitor a first communication channel during a discovery window that corresponds to a data link group. The device also includes a wireless interface configured to receive an announcement message from a first device of the data link group during the discovery window. The announcement message includes a multicast message and indicates availability of the candidate group key.

In another particular aspect, a method includes monitoring, at a second device of a data link group, a first communication channel during a discovery window that corresponds to the data link group. The method further includes receiving an announcement message at the second device from a first device of the data link group during the discovery window. The announcement message includes a multicast message and indicates availability of the candidate group key.

V. BRIEF DESCRIPTION OF THE DRAWINGS

VI. DETAILED DESCRIPTION

Figure 1:
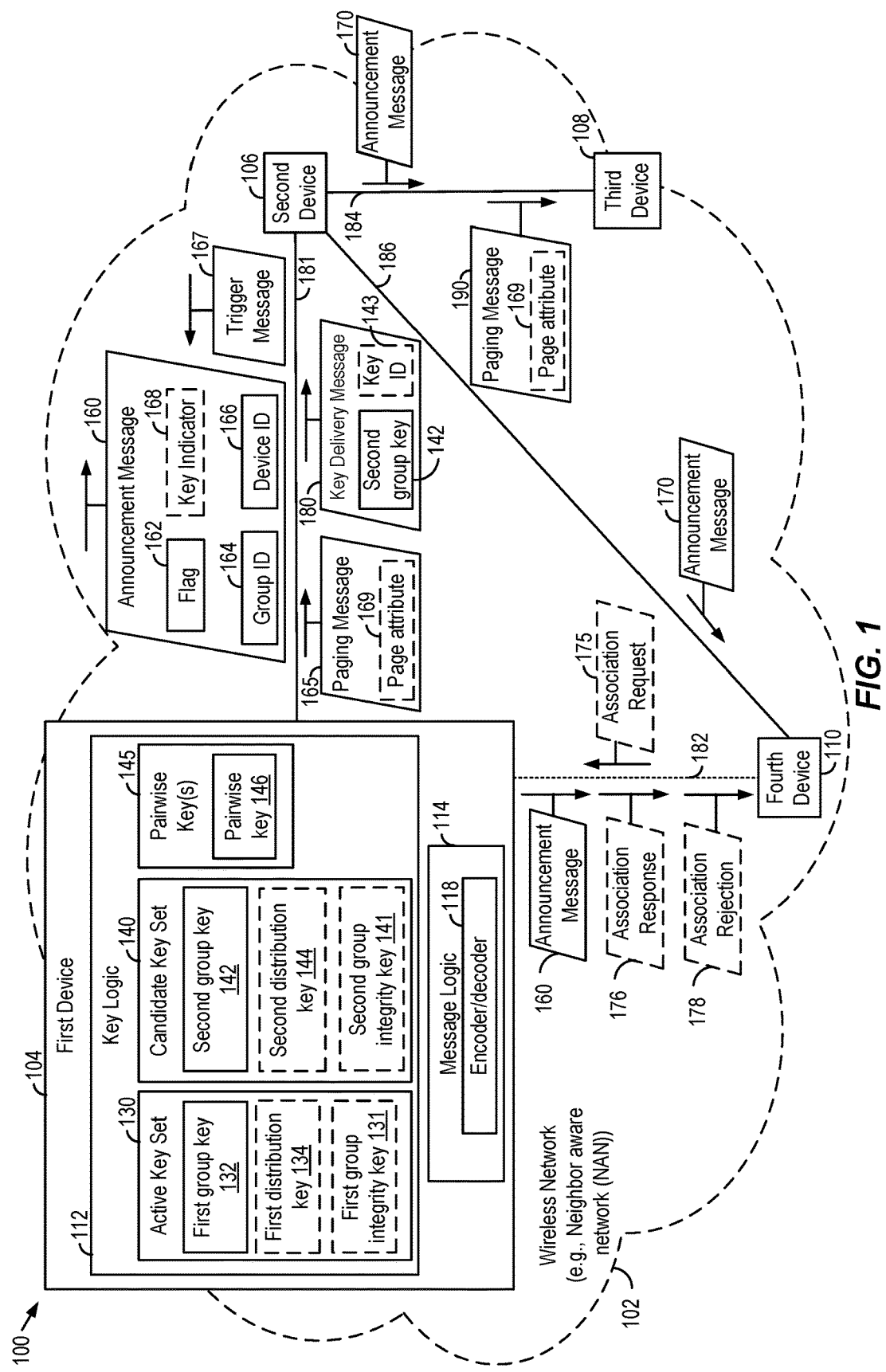
FIG. 1 is a diagram of a particular implementation of a system that supports transmission of an announcement message and distribution of a group key of a data link group.

Particular implementations of the present disclosure are described below with reference to the drawings. In the description, common features are designated by common reference numbers throughout the drawings. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

As used herein, various terminology is for the purpose of describing particular implementations only and is not intended to be limiting of implementations. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where."

In the present disclosure, devices in a data link group of a neighbor aware network (NAN) or a wireless mesh network may announce and distribute a group key, such as a new group key (or a candidate group key). A first device of the data link group may transmit an announcement message to one or more devices of the data link group. For example, the first device may send the announcement message as a multicast message during a paging window of a group transmission window that corresponds to the data link group. As another example, the announcement message may be sent during a discovery window corresponding to the NAN. The announcement message may include a flag that indicates availability of the candidate group key (e.g., a potential "next" active group key). Each device of the data link group may be awake (e.g., in an active mode) during the paging window, which may increase a likelihood that neighboring devices of the first device receive the announcement message.

A second device of the data link group may receive the announcement message from the first device and, in response to the announcement message, the second device may determine whether the second device is associated with the first device. If the second device is associated with the first device (e.g., the first device and the second device have successfully completed a security association, such as an authentication procedure, and established a pairwise key for secure peer-to-peer (P2P) communication), the second device may receive the candidate group key from the first device via a P2P communication.

If the first device and the second device are unassociated, the second device may wait to receive a second announcement message (corresponding to the candidate group key) from a third device that is associated with the second device. For example, after receiving the announcement message from the first device that is not associated with the second device, the second device may wait to receive the second announcement message from the third device that is associated with the second device. In response to receiving the second announcement message, the second device may request the candidate group key from the third device. The second device may wait to receive the second announcement message from an associated device until a predetermined time before an active group key of the data link group is set to expire. To illustrate, when the predetermined time is detected, expiration of the active group key is deemed to be imminent and the second device may initiate a security association with an unassociated device, such as the first device, and may request the candidate group key from the newly associated device (e.g., the first device). By waiting to receive an announcement message from an associated device until the predetermined time is detected, the second device does not automatically initiate a security association with the first device responsive to the announcement message. Accordingly, an amount of traffic corresponding to one or more devices making security associations (e.g., performing authentication procedures) in order to obtain the candidate group key may be reduced as compared to devices of data link groups that automatically associate with and request a group key from a device that sent an announcement message.

Referring to FIG. 1, a particular implementation of a system 100 that includes one or more devices of a data link group is shown. The system 100 includes a wireless network 102, such as a NAN or wireless mesh network, that supports distribution of a group key of the data link group and transmission of an announcement message corresponding to the group key. The wireless network 102 may also include or correspond to one or more data link groups.

The wireless network 102 may include one or more devices, such as a first device 104, a second device 106, a third device 108, and a fourth device 110. Each of the devices 104-110 may be a wireless communication device configured to transmit data and to receive data from one or more other wireless communication devices included in the wireless network 102. Each wireless device may include or correspond to a station, such as a wireless station or a wireless communication device, of the wireless network 102. The wireless network 102 may be an infrastructure network or an infrastructure-less network, such as a peer-to-peer network (e.g., an ad-hoc network). For example, each of the devices 104-110 of the wireless network 102 (e.g., the NAN) may be configured to perform association operations (e.g., security association operations), security information exchange operations, synchronization operations, and other operations via one or more wireless channels corresponding to the NAN. In some implementations, the devices 104-110 may perform such operations in accordance with one or more standards, such as an Institute of Electrical and Electronics Engineers (IEEE) 802.11 standard (e.g., a IEEE 802.11s standard), a Wi-Fi Alliance standard, a NAN standard, or a combination thereof, as illustrative, non-limiting examples. Although the wireless network 102 is illustrated as including four devices, in other implementations the wireless network 102 may include more than four devices or fewer than four devices.

The wireless network 102 may include or correspond to one or more data link groups (e.g., one or more meshes). As used herein, a data link group may include an infrastructure-less peer-to-peer network, such as an ad-hoc network. The data link group may include multiple devices that are able to form a network, such as a decentralized wireless network.

Additionally, each device of the data link group may use common security credentials that may be exchanged in band or out of band with one or more communication channels used by the data link group. In some implementations, the devices of the data link group may be synchronized to have periodic wake-up times, such as time periods when each of the devices is awake to advertise and receive traffic and other messages.

The wireless network 102 may include or correspond to a data link group that includes one or more devices, such as the devices 104-110. The data link group may also be referred to as a data link, a data link network, a group network, a NAN data link (NDL), a NDL network, a data path group, a data path group network, a NAN data path, a NAN data path group, or a NAN data path group network. In some implementations, the data link group may be a mesh group included in a mesh network, such as a "social Wi-Fi mesh network" or an Institute of Electrical and Electronics Engineers (IEEE) 802.11s mesh network, as illustrative, non-limiting examples. As another example, the data link group may include an infrastructure-less peer-to-peer (p2p) network.

As part of the data link group, the devices 104-110 of the data link group may perform data exchanges via wireless communications (e.g., without involving one or more wireless carriers, one or more Wi-Fi access points, the Internet, or a combination thereof). For example, the devices 104-110 of the data link group may share a security credential, such as a group key (e.g., a common group key), to enable communication. To illustrate, each device of the data link group may use the group key to encode and decode group messages. In some implementations, one or more services, such as a music service, a social media sharing service, a file sharing service, a gaming service, or other services may be provided by one or more of the devices 104-110 of the data link group. In some implementations, the devices 104-110 of the data link group may be synchronized to have periodic wake-up times, such as time periods when each of the devices 104-110 is "awake" (e.g., in an active operating mode) to advertise a service, to receive traffic or other messages, or a combination thereof. In some implementations, the wireless network 102 may include multiple data link groups, and each data link group of the wireless network 102 may have a corresponding group identifier, such as unique value (e.g., a byte value, a group address, or a combination thereof). When the wireless network 102 includes multiple data link groups, a particular device may be included in more than one data link group. Although the wireless network 102 is described as having four devices included in a data link group, in other implementations the wireless network 102 may include more than four devices or fewer than four devices.

The first device 104 may include key logic 112 and message logic 114. The key logic 112 may include (or store) an active key set 130, a candidate key set 140, and one or more pairwise keys 145. The active key set 130 may include one or more keys that correspond to the data link group and that are set to be used by devices of the data link group. To illustrate, the active key set 130 may include a first group key 132, a first distribution key 134, a first group integrity key 131, or a combination thereof. In a particular implementation, the active key set 130 may include two of the keys 131, 132, and 134, and the two keys may be referred to as a key pair. In another particular implementation, the active key set 130 may include all of the keys 131, 132, and 134, and the three keys may be referred to as a key trio. Similarly, the candidate key set 140 may include a second group key 142, a second distribution key 144, a second group integrity key 141, or a combination thereof. Although described as single active key set 130 and a single candidate key set 140, in some implementations the key logic 112 may be configured to store multiple active key sets, multiple candidate key sets, or both. For example, the key logic 112 may be configured to store a first active key set corresponding to a first data link group and a second active key set corresponding to a second data link group.

The active key set 130 may include the first group key 132 that is set as an active group key of the data link group. The first group key 132 may enable encryption (or encoding) and decryption (or decoding) of data link group messages communicated between devices of the data link group.

Optionally, the active key set 130 may include the first distribution key 134 that is set as an active distribution key of the data link group. The first distribution key 134 may correspond to the first group key 132, such that the first group key 132 and the first distribution key 134 constitute a first key pair. When the first distribution key 134 is set as the active distribution key, the first distribution key 134 may be used to encrypt a candidate group key, a candidate distribution key, a candidate group integrity key, or a combination thereof, to be communicated to other devices of the data link group, as described further herein.

Additionally, the active key set 130 may include the first integrity group key 131 that is set as an active integrity group key of the data link group. The first integrity group key 131 may correspond to the first group key 132, the first distribution key 134, or both. In implementations in which the active key set 130 includes the first group key 132, the first distribution key 134, and the first integrity group key 131, the first group key 132, the first distribution key 134, and the first integrity group key 131 constitute a first key trio. When the first integrity group key 131 is set as the active integrity group key, the first integrity group key 131 may be used for integrity protection of unencrypted (or unencoded) group addressed traffic. For example, a device with a message to send as an unencrypted group addressed message may generate a value based on the message and the first integrity group key 131. The value may be included in a particular field of the message. In a particular implementation, the value is included in a message integrity code (MIC) field in accordance with an IEEE 802.11 standard. A device that receives the unencrypted group addressed message may use the first group integrity key 131 to validate the unencrypted (or unencoded) group addressed message, which may provide security against devices altering the group addressed traffic and relaying altered group addressed traffic. To illustrate, the key logic 112 of the first device 104 may generate a first value based on the first group integrity key 131 and a received first unencrypted (or unencoded) multicast message and the key logic 112 may compare the first value to the particular value in the message, such as the particular value in the MIC field of the received unencrypted (or unencoded) multicast message. The key logic 112 may validate the first unencrypted multicast message if the first value matches the particular value. The key logic 112 may fail to validate the first unencrypted multicast message if the first value does not match the particular value. In a particular implementation, a message that is not validated is not forwarded and is discarded or otherwise erased.

The one or more pairwise keys 145 may be used for peer-to-peer (P2P) communication between the first device 104 and a device that is associated with the first device 104. For example, the one or more pairwise keys 145 may include a pairwise key 146 that may be used for P2P communication between the first device 104 and the second device 106 (a device that is associated with the first device 104), as described further herein. A device and the first device 104 may perform an association process to become associated. A device that is associated with the first device 104 may also be referred to as being in an associated state with the first device 104.

Each key included in the active key set 130 may be set as an active key for a corresponding time period. For example, the first group key 132 may be set as the active group key and may be included in the active key set 130 for a first time period. As another example, the first distribution key 134 may be set as the active distribution key and may be included in the active key set 130 for a second time period. As another example, the first group integrity key 131 may be included in the active key set 130 for a third time period. In other implementations, the first time period, the second time period, and the third time period may be the same time period. The first time period, the second time period, the third time period, or a combination thereof, may be a predetermined time period that is known (or determinable) by each device included in the data link group. In some implementations, the first time period, the second time period, or the third time period may partially overlap with another of key validity time period. In a particular implementation, the first time period is defined in a wireless communication standard, such as an IEEE 802.11 standard, a Wi-Fi Alliance standard, a NAN standard, or a combination thereof. In other implementations, the first time period and the second may be negotiated by devices of the data link group. In some implementations, the first time period may overlap with time periods of other group keys. In a particular implementation, the first group key 132 and the first time period do not expire. For example, the first time period may indicate an unlimited lifespan or may not indicate an end time, and thus the first group key 132 may have the unlimited lifespan and may not expire. When the first group key 132 does not expire, devices 104-110 may not generate candidate keys to replace the first group key 132.

The candidate key set 140 may include one or more keys that are available to be set as an active key(s) of the active key set 130. The candidate key set 140 may include the second group key 142 (e.g., a candidate group key), the second distribution key 144 (e.g., a candidate distribution key), the second group integrity key 141 (e.g., a candidate group integrity), or a combination thereof. The second distribution key 144 may correspond to the second group key 142, such that the second group key 142 and the second distribution key 144 constitute a second key pair. The second group key 142 may be used (e.g., set) as the active group key and may be included in the active key set 130 upon expiration of the first time period. Accordingly, the second group key 142 may follow (e.g., replace) the first group key 132 as the active group key. The second distribution key 144 may be used (e.g., set) as the active distribution key and may be included in the active key set 130 upon expiration of the second time period. Accordingly, the second distribution key 144 may follow (e.g., replace) the first distribution key 134 as the active distribution key. The second group integrity key 141 may follow (e.g., replace) the first group integrity key 131 upon expiration of the third time period.

The second group integrity key 141 (e.g., a candidate group integrity key) may correspond to the second group key 142, the second distribution key 144, or both, such that the second group key 142, the second distribution key 144, and the second group integrity key 141 constitute a second key trio. The second group integrity key 141 may follow (e.g., replace) the first group integrity key 131 and may be used for integrity protection for unencrypted (or unencoded) group addressed traffic.

The candidate key set 140 may be obtained by the first device 104 prior to expiration of the active key set 130. For example, the second group key 142 may be obtained by the first device 104 prior to expiration of the first time period (e.g., prior to expiration of the first group key 132 as the active group key). To obtain the candidate key set 140, the first device 104 may be configured to generate the candidate key set 140, as described with reference to FIG. 2. Additionally or alternatively, the candidate key set 140 may be generated by another device of the data link group and communicated (e.g., distributed) to the first device 104 using a key delivery message 180, as described further herein.

The message logic 114 may be configured to generate and process messages communicated among devices of the wireless network 102. The message logic 114 may include an encoder/decoder 118 that is configured to encode and decode messages communicated among the devices 104-110 of the wireless network 102. For example, the encoder/decoder 118 may use one of the active key set 130, such as the 132 or 134 to encode (e.g., encrypt) a message to be communicated to another device of the data link group. In other implementations, the message logic 114 may include an encoder and a decoder that is distinct from the encoder.

In some implementations, the message logic 114 may be configured to encode and decode secure messages communicated between the first device 104 and a device, such as the second device 106, that is associated with the first device 104 (as indicated by the solid line 181). To illustrate, the first device 104 and the second device 106 may make or perform a security association (e.g., perform an authentication process) to enable peer-to-peer (P2P) communication between the first device 104 and the second device 106. As part of the authentication process, the pairwise key 146 may be generated to enable secure communication between the first device 104 and the second device 106. The pairwise key 146 may be stored at each of the first device 104 and the second device 106. For example, the first device 104 may include the pairwise key 146 in the one or pairwise keys 145. The one or more pairwise keys 145 may include the pairwise key 146 as long as the first device 104 is associated with the second device 106. The message logic 114 may use the pairwise key 146 to encode and decode one or more P2P messages communicated between the first device 104 and the second device 106.

Additionally or alternatively, one or more of the messages communicated among the devices 104-110 of the wireless network 102 may not be encoded (e.g., encrypted). For example, the message logic 114 may generate a message and the first device 104 may send the message to another device of the wireless network 102 without encoding the message using the encoder/decoder 118. To illustrate, the first device 104 may be unassociated with the fourth device 110 (as indicated by the dashed line 182) and the first device 104 may send an unsecure message (e.g., an un-encoded message or unencrypted) to the fourth device 110. Additionally, the first device 104 may send unsecure messages to one or more associated devices.

During operation, the first device 104 may be configured to generate the second group key 142 prior to expiration of the first group key 132. For example, the first device 104 may generate the second group key 142 in response to completing a countdown from a random value, or a pseudo-random value, as further described with reference to FIG. 2. The second group key 142 may replace the first group key 132 as an active group key of the data link group to enable each device in the data link group to encrypt and decrypt group messages (e.g., group transmissions).

In some implementations, the devices 104-110 of the data link group may generate the group keys by random number generation. For example, the first device 104 may be configured to generate the second group key 142 by using a random number generator, a pseudo-random number generator, or other random number generation methods. The second group key 142 may include 256 randomly generated or pseudo-randomly generated bits. Each data link group of the wireless network 102 may include a unique group key. The devices of the data link group may not use a group key that has been previously used. For example, the devices of the data link group may store expired keys (e.g., expired active key sets) and candidate keys (e.g., candidate key sets) to prevent reuse of group keys. To illustrate, the first device 104 may generate the first group key 132 and compare the first group key 132 to the second group key 142 to determine if the second group key 142 is unique. In response to determining that the second group key 142 is not unique, the first device 104 may randomly generate another candidate key, such as a second candidate group key. In response to determining that the second group key 142 is unique, the first device 104 may transmit an announcement message corresponding to or indicating generation of the second group key 142. In a particular implementation, the second group key 142 may be generated in response to the countdown from the random value.

In some implementations, a dedicated device of the data link group may be configured to generate candidate group keys. The device may be referred to as a key generator device of the data link group. To illustrate, the other devices of the data link group may not generate group keys (or candidate group keys) while a particular device operates as the key generator device. The key generator device may also be referred to as a "leader" device of the data link group. In some implementations, the key generator device may be a provider of a service of the data link group, such as a one-to-one service, a one-to-many service, or both. In some implementations, a particular device of the data link group may determine to operate as the key generator device based on satisfying one or more criteria. For example, the first device 104 may determine to operate as the key generator device based on the first device 104 being an originator of the data link group, based on the first device 104 being in an associated state with more devices of the data link group than any other device of the data link group, based on the first device 104 having spent more time in the NAN than the other devices of the data link group, based on a number of devices in the associated state with the first device 104, based on a topology of the NAN, based on a duration of time the first device 104 has been included in the NAN, based on a rank of the first device 104 within the NAN, based on a battery level of the first device 104, or a combination thereof. In a particular implementation, the key generator device may be indicated after creation of the data link group by the originator of the data link group. For example, the originator may transmit a message to devices of the data link group that indicates a particular device is to operate as the key generator device.

In another particular implementation, a particular device of the data link group may be elected to operate as the key generator device by the devices of the data link group. The election may be based on one or more of the above-listed criteria. For example, a particular device may be elected to operate as the key generator device based on the particular device having a more "favorable" position in the data link topology than other devices of the data link group. A favorable position in a topology of the data link group may correspond to the particular device being less than a threshold number of hops from each other device of the data link group. As another example, a particular device may be elected to operate as the key generator device based on the particular device being in an associated state with more devices than any other device of the data link group.

In a particular implementation, a device configured to generate a candidate key may become the key generator device if the current key generator device becomes unavailable or terminates performance of key generation operations. For example, if the particular device currently operating as the key generator device disassociates from the data link group or the NAN, or if the particular device indicates an inability to perform key generation operations, a different device of the data link group may be selected to operate as the key generator device. In a particular implementation, prior to becoming unavailable, the particular device may select a different device to operate as the key generator device and the particular device may transmit a message to the selected device. In another implementation, a device may determine that the particular device is no longer performing key generation operations and the device may begin performing key generation operations. Alternatively, a different device of the data link group may be elected by the devices of the data link group to operate as the key generator device.

Devices of the data link group may also be configured to transmit or to receive messages corresponding to group keys. To illustrate, the message logic 114 may be configured to generate and to process messages communicated among devices of the data link group. In some implementations, the message logic 114 may be configured to encode and decode or encrypt and decrypt secure messages communicated between the first device 104 and a device, such as the second device 106, that is associated with the first device 104 (as indicated by the solid line 181). In some implementations, the first group key 132 may be used to encrypt or decrypt group-addressed data, such as multicast data or broadcast data.

The first device 104 may be configured to generate an announcement message 160 corresponding to generation of the second group key 142. For example, the message logic 114 may be configured to generate the announcement message 160. The announcement message 160 may indicate at least one key of the candidate key set 140 is available. For example, the announcement message 160 that a candidate group key (e.g., the second group key 142) is available and is to replace the first group key 132 as the active group key. The announcement message 160 may be generated by the first device 104 in response to generating the second group key 142 and before distributing the second group key 142 to the other devices 106-110 of the data link group. Alternatively, the second group key 142 may be generated after completion of a countdown, and the announcement message 160 may be generated in response to completion of the countdown and prior to generation or distribution of the second group key 142. In some implementations, the announcement message 160 may be encoded (or encrypted) by the message logic 114 using a key, such as the first group key 132 or the pairwise key 146. In other implementations, the message logic 114 may not encode (or encrypt) the announcement message 160.

The announcement message 160 may include a flag 162, a group identifier (ID) 164, and a device ID 166. The flag 162 may include one or more bits, a field, or a combination thereof, that indicates the announcement message is a group key announcement message. The group ID 164 may be an identifier of the data link group that uniquely identifies the data link group. For example, the group ID 164 may include one or more bits, such as a byte value or a group address, that corresponds to the data link group. The device ID 166 may be a medium access control (MAC) address that corresponds to a device that generated the candidate group key. For example, the device ID 166 of the announcement message 160 may be a MAC address of the first device 104. In some implementations, the announcement message 160 may include a timestamp corresponding to a time when the second group key 142 (or the candidate key set 140) was generated or when generation of the second group key 142 (or the candidate key set 140) was initiated. Additionally or alternatively, the announcement message 160 may include a second device ID that corresponds to a particular device that transmits the announcement message 160. For example, the second device ID may be a MAC address of a device that transmits the announcement message 160, such as the first device 104.

In some implementations, the announcement message 160 also includes a key indicator 168. The key indicator 168 may provide information related to the second group key 142. For example, the key indicator 168 may include a hash value generated based on the second group key 142, a timestamp corresponding to generation of the second group key 142, a MAC address of the first device 104, or a combination thereof. The key indicator 168 may enable a device that receives the announcement message 160 to determine whether the second group key 142 is to become the next active key for the data link group, as further described herein.

After generation of the announcement message 160, the first device 104 may transmit the announcement message 160 to other devices of the data link group. The announcement message 160 may be sent as a secure message or as an unsecure message. If the announcement message 160 is sent as a secure message, the announcement message 160 may be an encrypted message, and if the announcement message 160 is sent as an unsecure message, the announcement message 160 may be an un-encrypted message. For example, prior to sending the announcement message 160, the encoder/decoder 118 may encrypt the announcement message 160 using a particular key of the active key set 130, such as the first group key 132. Alternatively, the encoder/decoder 118 may not encrypt the announcement message 160. If the announcement message 160 is not encrypted, the encoder/decoder 118 may protect the announcement message 160 using the first group integrity key 131.

The first device 104 may be configured to transmit the announcement message 160 to at least one of the devices 106-110 of the data link group as a multicast message. The announcement message 160 may be transmitted via a first wireless channel. The announcement message 160 may be transmitted to devices that are associated with the first device 104 and to devices that are not associated with the first device 104. For example, the announcement message 160 may be transmitted to the second device 106, which is associated with the first device 104 (as indicated by the solid line 181). Additionally, the announcement message 160 may be transmitted to the fourth device 110, which is unassociated with the first device 104 (as indicated by the dashed line 182). The first wireless channel may correspond to the NAN communication channel, a data link group channel, or both.

In a particular implementation, the first device 104 may transmit the announcement message 160 during a paging window of the first communication channel. The paging window may be designated for the data link group and the paging window may correspond to the NAN communication channel or the data link group channel. To illustrate, the paging window may include a particular time period designated for particular communication via the NAN communication channel or the data link group channel. In another particular implementation, the first device 104 may transmit the announcement message 160 during a discovery window of the first communication channel. The discovery window may correspond to the NAN communication channel. Additionally or alternatively, the first device 104 may send the announcement message 160 as a peer-to-peer (P2P) communication to a particular device, such as the second device 106, that is associated with the first device 104.

Each of the devices 104-110 of the data link group may be in an active mode during the paging window, the discovery window, or both, which may increase a likelihood that neighboring devices of the first device 104 receive the announcement message 160. Devices that are within a communication range of the first device 104, such as devices that are one-hop away from the first device 104, may receive the announcement message 160. For example, the second device 106 and the fourth device 110 may receive the announcement message 160 and may be referred to as "neighboring" devices of the first device 104 because the devices 106 and 110 are within a particular communication range (e.g., a one-hop range) of the first device 104, as described by the IEEE 802.11s standard, a Wi-Fi Alliance standard, or a combination thereof. The third device 108 is not within the particular communication range and is not considered a neighboring device of the first device 104 because the third device is multiple hops away from the first device 104.

One or more devices may receive and forward the announcement message 160 so that the announcement message 160 reaches each device in the data link group. For example, in response to the second device 106 receiving the announcement message 160 from the first device 104, the second device 106 may forward the announcement message 160 as an announcement message 170 (e.g., a forwarded announcement message) to other devices of the data link group. To illustrate, the second device 106 may send the announcement message 170 to the third device 108 and to the fourth device 110. In some implementations, another device that receives the announcement message 160 from the first device 104 may not forward the announcement message 160 until after the other device receives the second group key 142 (or the candidate key set 140) that corresponds to the announcement message 160.

In some implementations, the message logic 114 may be further configured to generate a paging message 165 after the announcement message 160 is transmitted. The paging message 165 may indicate that data is scheduled to be transmitted from a particular device, such as the first device 104, to other devices of the data link group. The data scheduled to be transmitted may include at least one key of the candidate key set 140, such as the second group key 142. In some implementations, the paging message 165 may be a multicast message. For example, the paging message 165 may be transmitted to multiple devices of the data link group, and the paging message 165 may indicate that data is scheduled to be transmitted to multiple devices of the data link group. In some implementations, the paging message 165 may be encrypted using the first group key 132. The paging message 165 may optionally include a page attribute 169. Details of the page attribute 169 are further described herein with reference to FIG. 6

The first device 104 may be configured to transmit the paging message 165 to neighboring devices of the data link group that are associated with the first device 104. For example, the first device 104 may transmit the paging message 165 to the second device 106. In some implementations, the paging message 165 may be transmitted via the first wireless channel (the NAN communication channel). In other implementations, the paging message 165 may be transmitted via a second wireless channel (data link group channel). The paging message 165 may be transmitted during a paging window of a transmission window designated for (or corresponding to) the data link group. Each device of the data link group may be configured to operate in the active operating mode during the paging window so that paging messages may be received and transmitted.

In some implementations, the second device 106 may be configured to transmit a trigger message 167 to the first device 104 in response to receiving the paging message 165. The trigger message 167 indicates that the second device 106 is scheduled to be operating in the active operating mode during a data window of a current transmission window or a subsequent transmission window. For example, in response to receiving the paging message 165 indicating that the first device 104 has data scheduled to be transmitted to the second device 106 during a data window, the second device 106 may transmit the trigger message 167. Additionally, the second device 106 may remain operating in the active operating mode during the data window in order to receive data from the first device 104. The trigger message 167 may be transmitted via the second wireless channel (the data link group channel) during the paging window or the data window. Alternatively, the trigger message 167 may be transmitted via the first wireless channel (the NAN communication channel).

After receiving the trigger message 167, the first device 104 may generate a key delivery message 180. The key delivery message 180 may include the second group key 142 that is to be distributed to the devices 106-110 of the data link group. In some implementations, the key delivery message 180 may include one or more keys of the candidate key set 140. The first device 104 may transmit the key delivery message 180 to the second device 106 prior to expiration of the first group key 132 (e.g., the active group key). In some implementations, the key delivery message 180 may further include a key identifier 143, illustrated as the key ID in FIG. 1. The key identifier 143 may indicate a lifespan or an expiration time of the second group key 142. In some implementations, the key delivery message 180 may be a secure message and may be transmitted as a unicast message from the first device 104 to the second device 106. For example, the key delivery message 180 may be encrypted based on the pairwise key 146 and may be transmitted from the first device 104 to the second device 106 via unicast transmission. The key delivery message 180 may be transmitted via the second wireless channel (the data link group channel) during the data window. Alternatively, the key delivery message 180 may be transmitted via the first wireless channel (the NAN communication channel).

If the first device 104 does not receive the trigger message 167, for example if the paging message 165 or the trigger message 167 does not reach a destination or if second device 106 is unable to respond to the paging message 165, the first device 104 does not transmit the key delivery message 180. In this example, the first device 104 may transmit a second paging message to the second device 106 during a second paging window. In this manner, the first device 104 may not transmit the key delivery message 180 until receiving a trigger message, such as the trigger message 167, from the second device 106. In other implementations, paging messages, trigger message or both may not be used. For example, the first device 104 may generate the key delivery message 180 without transmitting the paging message 165 or receiving the trigger message 167. In a particular implementation, the first device 104 may generate and transmit the key delivery message 180 after the announcement message 160 is transmitted during the discovery window. In another particular implementation, the first device 104 may generate and transmit the key delivery message 180 in response to completion of a countdown. The countdown may be related to expiration of the active group key and may occur before the expiration of the active group key.

The second device 106 may be configured to propagate the second group key 142 to other devices of the data link group. For example, in response to receiving the key delivery message 180 (or at least one key of the candidate key set 140), the second device 106 may transmit a paging message 190 to neighboring devices of the data link group. To illustrate, the second device 106 be associated with the third device 108 (as indicated by the solid line 184), and the second device 106 may transmit the paging message 190 to the third device 108. The paging message 190 may indicate that the second device 106 has data (corresponding to at least one key of the candidate key set 140, such as the second group key 142) scheduled to be transmitted to the third device 108. In response to receiving a trigger message (not illustrated) from the third device 108, the second device 106 may forward the key delivery message 180 to the third device 108. In this manner, the second group key 142 may propagate to devices of the data link group.

Although generation of a single candidate group key (e.g., the second group key 142) is described, in some implementations multiple devices of the data link group may be configured to generate a candidate group key (or a candidate key set) if an announcement message related to the second group key 142 has not been received by a particular time. For example, each of the devices 104-110 may be configured to start a timer from a random value, and when the timer reaches a particular value, to generate a new candidate group key (or a new candidate key set). Each of the devices 104-110 may be configured to start the timer in response to a prior group key expiring (such as the first group key 132) or a candidate group key becoming an active group key (such as the second group key 142). If an announcement message is received by a particular device prior to the timer reaching the particular value, the timer of the particular device may be stopped and no candidate group key is generated by the particular device. If the timer reached the particular value, the particular device initiates generation of a candidate group key.

If multiple announcement messages or multiple group keys (e.g., multiple candidate key sets) are received by the devices of the data link group, the devices of the data link group may set a particular candidate group key (or a particular candidate key set) as the next active group key (or the next active key set) based on key indicators. To illustrate, a particular candidate group key may be selected as the next active group key based on a key indicator corresponding to the particular candidate group key having a higher priority than other key indicators corresponding to other candidate group keys. As an illustrative example, a candidate group key having an earliest timestamp may be set as the next active group key. To illustrate, the second device 106 may perform a comparison between a first timestamp (e.g., a first priority) and a second timestamp (e.g., a second priority). The second device 106 may select a candidate group key corresponding to the first timestamp based on the first timestamp being earlier than the second timestamp. As another example, a candidate group key having a highest (or lowest) hash value may be set as the next active group key. As another example, a candidate group key generated by a device having a highest priority MAC address may be set as the next active group key.

Announcement messages corresponding to candidate group keys that are not selected are not forwarded by devices of the data link group. For example, if the second device 106 receives a second announcement message after receiving the announcement message 160 and the second announcement message includes a later timestamp corresponding to another candidate group key, the second device 106 does not forward the second announcement message. In some implementations, the second device 106 may send a rejection message in response to receiving the second announcement message, or in response to receiving a paging message corresponding to the second announcement message.

In some implementations, the first device 104 may communicate the key delivery message 180 to the one or more devices of the data link group as a multicast message. The multicast message may include or correspond to a public action frame or a data link group message. When the key delivery message 180 is communicated as the multicast message, the first device 104 may encode (or encrypt) the key delivery message 180 using a particular active key of the data link group. For example, when the active key set 130 includes the first distribution key 134 that is set as the active distribution key of the data link group, the encoder/decoder 118 may encode (or encrypt) the key delivery message 180 using the first distribution key 134. Using the first distribution key 134 to encrypt the key delivery message 180 may provide additional security when transmitting the key delivery message 180. To illustrate, the first distribution key 134 may only be used to encode and decode (or encrypt and decrypt) key delivery messages, such as the key delivery message 180, and the first group key 132 may be used for other secure group communications. Because the first group key 132 is used more often than the first distribution key 134, the first group key 132 is more susceptible to being compromised (e.g., being identified by a device that is not part of the data link group). Accordingly, using the first distribution key 134 to distribute the second group key 142, the second distribution key 144, or both, as a multicast message to the devices of the data link group may be more secure than using the first group key 132 to distribute the second group key 142, the second distribution key 144, or both, to the devices of the data link group.

The first device 104 may distribute the key delivery message 180 as the multicast message regardless of whether the first device 104 obtained the second group key 142 by generating the second group key 142 or by receiving the second group key 142 from another device of the data link group. By encoding (or encrypting) the second group key 142 using the first distribution key 134 and sending a multicast message that includes the encoded second group key, the encoded second group key (e.g., the second group key 142) may be distributed to the one or more devices of the data link group without performing a security association procedure, P2P communications, or a combination thereof, between the first device 104 and another device of the data link group For example, the first device 104 may transmit a multicast message to distribute the encoded (or encrypted) second group key 142 to multiple devices at the same time, regardless of whether the multiple devices are associated or unassociated with the first device 104. To illustrate, the first device 104 may multicast the encoded (or encrypted) second group key 142 to the second device 106 that is associated with the first device 104 and to the fourth device 110 that is unassociated with the first device 104. Thus, using the first distribution key 134 to multicast the encoded second group key (the second group key 142) may reduce key-related traffic and overhead related to candidate group key distribution within the wireless network 102.

Additionally or alternatively, the first device 104 may communicate the key delivery message 180 as a P2P communication. To illustrate, after transmission of the announcement message 160, the first device 104 may receive a request for the second group key 142 from an associated device. In some implementations, the request for the second group key 142 may include a request for the candidate key set 140. The second device 106 may be associated with the first device 104 when the second device 106 receives the announcement message 160 and the second device 106 may send a request for the second group key 142 in response to the announcement message 160. The second device 106 may send the request as a P2P message. In response to the request, the first device 104 may send the key delivery message 180 to the second device 106 as a P2P message. In some implementations, the first device 104 may automatically send the key delivery message 180 as a P2P message to one or more devices associated with the first device 104. For example, the first device 104 may automatically send the key delivery message 180 as the P2P message without receiving a request for the second group key 142 from an associated device.

In some implementations, after sending the announcement message 160 to a particular device that is unassociated with the first device 104, the first device 104 may perform a security association procedure to become associated with the particular device. For example, the fourth device 110 may be unassociated with the first device 104 when the fourth device 110 receives the announcement message 160. After receiving the announcement message 160, the fourth device 110 may initiate a security association procedure with the first device 104 to become associated with the first device 104. After the fourth device 110 is associated with the first device 104, the first device 104 may send a P2P communication that includes the second group key 142 to the fourth device 110. For example, the first device 104 may automatically send the second group key 142 to the fourth device 110 or the first device 104 may send the second group key 142 in response to a request received from the fourth device 110 for the second group key 142.

In a particular implementation, when a particular device that receives the announcement message 160 from the first device 104 is unassociated with the first device 104, the particular device may wait to receive another announcement message (e.g., the announcement message 170) from an associated device until a predetermined time before the active group key, such as the first group key 132, of the data link group is set to expire. When the predetermined time is detected, expiration of the active group key is deemed to be imminent. A time period between the particular device receiving the announcement message 160 from an unassociated device and detection of the predetermined time may be referred to as a waiting period. During the waiting period, the particular device may wait to receive a second announcement message from a device that is associated with the particular device so that the particular device can receive the second group key 142. If the particular device does not receive the second announcement message during the waiting period, the particular device may initiate a security association procedure with an unassociated device after the predetermined time is detected so that the particular device can acquire the second group key 142.

To illustrate, the fourth device 110 may be unassociated with the first device 104 when the fourth device 110 receives the announcement message 160. Rather than initiating a security association process to associate with the first device 104 in response to receiving the announcement message 160, the fourth device 110 may wait to receive a forwarded version of the announcement message 160, such as the announcement message 170, from another device of the data link group that the fourth device 110 is associated with. To illustrate, the fourth device 110 may be associated with the second device 106 (as indicated by the solid line 186) and may receive the announcement message 170 from the second device 106 after receiving the announcement message 160 from the first device 104. After receiving the announcement message 170 from the second device 106, the fourth device 110 may receive the second group key 142 (or the candidate key set 140) from the second device 106 as a P2P communication. For example, the second device 106 may send the second group key 142 to the fourth device 110 automatically or in response to a request received from the fourth device 110 for the second group key 142. By waiting to receive another announcement message 170 from an associated device 106, the fourth device 110 does not automatically initiate a security association with the first device 104 responsive to receiving the announcement message 160 from the first device 104.

The fourth device 110 may wait to receive the second announcement message (e.g., the announcement message 170) from an associated device until a predetermined time before the active group key, such as the first group key 132, of the data link group is set to expire. To illustrate, when the predetermined time is detected, expiration of the active group key is deemed to be imminent. If the fourth device 110 has not received the second announcement message from an associated device, the fourth device 110 may initiate a security association procedure with an unassociated device, such as the first device 104, in order to receive the second group key 142 (or the candidate key set 140). To illustrate, the fourth device 110 may initiate a security association procedure with the first device 104 and, after completion of the security association procedure, the fourth device 110 may receive the second group key 142 (or the candidate key set 140) from the first device 104. For example, the first device 104 may send the second group key 142 to the fourth device 110 automatically or in response to a request received from the fourth device 110 for the second group key 142.

In another particular implementation, each device of the data link group may be configured to initiate generation of a candidate group key in anticipation of expiration of the active group key. To illustrate, each device may be configured to generate a random value and start a countdown from the generated random value when the time period of the active group key nears expiration, as described with reference to FIG. 2. When the countdown at a particular device is complete, the particular device may generate a candidate group key and transmit an announcement message to other devices. For example, the first device 104 may complete a corresponding countdown, generate the second group key 142, and transmit the announcement message 160. The other devices, such as the second device 106 and the fourth device 110, may stop their respective countdowns (and refrain from generating additional candidate group keys) in response to receiving the announcement message (e.g., the announcement message 160). Upon receipt of the announcement message 160 or the announcement message 170, a particular device may also conditionally suppress (based on suppression criteria) propagation of one or more additional announcement messages, candidate group keys, or a combination thereof. For example, the suppression criteria may be applied to select a particular candidate group key that corresponds to a timestamp that is older or that is generated by a device having a higher value MAC address, as illustrative, non-limiting examples. By suppressing announcement messages, candidate group keys, or a combination thereof, the data link group may avoid having multiple (conflicting) candidate group keys set as the active group key.

In some implementations, two devices of the data link group may be neighboring devices and may be unassociated. For example, as illustrated in FIG. 1, the first device 104 may be within a communication range (e.g., a one hop range) of the fourth device 110 and may be unassociated with the fourth device 110 (as indicated by the dashed line 182). The fourth device 110 may be associated with a different device of the data link group, such as the second device 106 (as indicated by the solid line 186). Even though the devices are unassociated, some messages, such as multicast messages, may be shared between the devices. For example, when the announcement message 160 is multicast, the first device 104 may transmit the announcement message 160 to the fourth device 110.

In some implementations, devices of the data link group may be configured to wait until a particular time to receive a candidate group key from other devices of the data link group. If a candidate group key is not received by the particular time, such as a particular amount of time prior to expiration of the current group key, a device may be configured to associate with another device of the data link group in order to receive the candidate group key. The particular amount of time prior to expiration of the current group key may indicate or may correspond to an end of a group key update window, a beginning of an association window, or both. The group key update window may include a particular time interval corresponding to performance of key update operations (e.g., selecting a particular candidate group key and distributing the particular candidate group key to devices of the data link group). When the first group key 132 is set as the active group key, devices of the data link group may initiate a countdown. The countdown may have a shorter duration than a validity period of the first group key 132. The duration of the countdown (or an initial countdown value) may be selected such that the period of time between expiration of the countdown and expiration of the first group key 132 is sufficient for a device to perform one or more association operations with other devices of the data link group. Although a countdown is described, any form of timer or timing circuitry may be used to track the time period corresponding to the countdown.

In the example illustrated in FIG. 1, the fourth device 110 may start a countdown (having a first duration) when the first group key 132 is set as an active key. In other implementations, the countdown may be started when the announcement message 160 is received from the first device 104, and the countdown may have a different duration than the first duration. If the countdown expires and the fourth device 110 has not received the second group key 142, for example by receiving a key delivery message, the fourth device 110 may enter a "panic mode" and may attempt to associate with a device from which the fourth device 110 received an announcement message. For example, the fourth device 110 may attempt to associate with the first device 104 because the fourth device 110 received the announcement message 160 from the first device 104.

To associate with the first device 104, the fourth device 110 may transmit an association request 175 to the first device 104. The association request 175 may identify the fourth device 110 and may indicate that the fourth device 110 would like to perform an association with the first device 104. In response to receiving the association request 175, the first device 104 may determine whether to associate with the fourth device 110 based on at least one criterion. As one example, the criterion may include a number of other devices the first device 104 is currently associated with. To illustrate, the first device 104 may be configured to associate with no more than a threshold number of other devices of the data link group. In this example, the first device 104 may determine whether the first device 104 is currently associated with the threshold number of other devices. If the first device 104 is associated with at least the threshold number of devices, the first device 104 may determine not to associate with the fourth device 110. If the first device 104 is associated with fewer than the threshold number of devices, the first device 104 may determine to associate with the fourth device 110.

Additionally or alternatively, the at least one criterion may be related to "need-based" associations. For example, the first device 104 may be configured to associate with other devices on an "as-needed" basis. As an example, a need-based association may include an association with a device that is not currently associated with any other device of the data link group. As another example, need-based association may be determined based on active traffic sessions. To illustrate, the first device 104 may disassociate with the second device 106 in response to determining that the first device 104 does not have an active traffic session for the second device 106 during an upcoming paging window. As another example, the first device 104 may disassociate with the second device 106 in response to determining that the second device 106 already received the second group key 142. In this manner, the first device 104 may be configured to disassociate with some devices of the data link group in order to associate with other devices that may have a greater "need."

If the first device 104 determines to associate with the fourth device 110, the first device 104 may transmit an association response 176 to the fourth device 110. The association response 176 may include information to enable the fourth device 110 to associate with the first device 104. In response to receiving the association response 176, the fourth device 110 may associate with the first device 104. For example, the fourth device 110 may perform one or more association operation with the first device 104. In a particular implementation, the one or more association operations may include a 2-way handshake, a 4-way handshake, an exchange of security information, or a combination thereof. In other implementations, other association operations may be performed. During performance of the association operations, a pairwise key may be developed between the first device 104 and the fourth device 110.

If the first device 104 determines not to associate with the fourth device 110, the first device 104 may transmit an association rejection 178 to the fourth device 110. The association rejection 178 may indicate that the first device 104 is unable to perform association operations with the fourth device 110 at this time. The association rejection 178 may indicate a set of devices that are associated with the first device (e.g., a set of devices having possession of the second group key 142). For example, the association rejection 178 may indicate that the first device 104 is associated with the second device 106. Additionally or alternatively, the association rejection 178 may indicate a set of devices that have already received or already have possession of the second group key 142. For example, the association rejection 178 may indicate that the second device 106 has already received or already has possession of the second group key 142. The fourth device 110 may transmit a second association request to the second device 106 in response to the second device 106 being indicated in the association rejection 178. The association request 175, the association response 176, and the association rejection 178 may be transmitted via the first wireless channel or the second wireless channel.

In some implementations, the fourth device 110 may be configured to continue attempting to associate with the first device 104 until an association is performed or until the first group key 132 expires. For example, the fourth device 110 may transmit a second association request (not illustrated) to the first device 104 if the fourth device 110 is not associated with another device that has received the second group key 142. As another example, if the fourth device 110 receives the announcement message 170 from the second device 106, the fourth device 110 may attempt to associate with the second device 106.

In some implementations, the fourth device 110 does not wait for expiration of a countdown prior to attempting to associate with the first device 104. Instead, the fourth device 110 may be configured to associate with the first device 104 in response to receiving the announcement message 160. For example, the fourth device 110 may transmit the association request 175 to the first device 104 in response to receiving the announcement message 160 from the first device 104. Additionally or alternatively, when the fourth device 110 is unassociated with the second device 106, the fourth device 110 may transmit an association request to the second device 106 in response to receiving the announcement message 170 from the second device 106. The first device 104 (or the second device 106) may determine whether to associate with the fourth device 110, as described above. Because the fourth device 110 does not wait for expiration of a countdown prior to attempting to associate with other devices of the data link group, the fourth device 110 may have more time to associate with a different device if an association attempt fails, thereby increasing a likelihood that the fourth device 110 is able to associate with a different device and receive the second group key 142 prior to expiration of the first group key 132.

In some implementations, the devices 104-110 of the data link group may communicate key delivery messages and a candidate group key (or a candidate key set) to another device of the data link group as a unicast messages. In a particular implementation, a 4-way handshake may be used to exchange a candidate group key (or a candidate key set) between two unassociated devices of the data link group using unicast messages. The 4-way handshake may include an extension authentication protocol over local area network (EAPOL) key frame which is encrypted using a key encryption key (KEK) and integrity protected using a key confirmation key (KCK). The KEK and the KCK may be included in a pairwise key. The EAPOL key frame may include the candidate group key, such as the second group key 142. In some implementations, the EAPOL key frame may include the candidate key set 140. The EAPOL key frame may correspond to or be included in a third message (or communication) between two unassociated devices.

As an illustrative example of performing a 4-way handshake, the first device 104 and the fourth device 110 may be unassociated and the first device 104 may transmit a first message to the fourth device 110. The first message may enable the fourth device 110 to generate the pairwise key. The first device 104 may receive a second message from the fourth device 110 and generate the pairwise key based on the second message. The first device 104 may transmit a third message to the fourth device 110 including the EAPOL key frame, the EAPOL key frame including the second group key 142. The EAPOL key frame may be encrypted based on the KEK and integrity protected based on the KCK. The first device 104 may receive a fourth message from the fourth device 110. The fourth message may include an acknowledgement message that indicates that the fourth device 110 received the second group key 142 and that the fourth device 110 is now associated with the first device 104.

In another particular implementation, a group key handshake (e.g., a 2-way handshake) may be used to exchange a candidate group key between two associated devices of the data link group using unicast messages. The group key handshake may include an EAPOL key frame, which may be encrypted and integrity protected. The EAPOL key frame may be transmitted as a first message (or communication) between two associated devices. As an illustrative example of performing a group key handshake, the first device 104 and the second device 106 may be associated and the first device 104 and the second device 106 may already possess the pairwise key 146. For example, the pairwise key 146 may have been generated during association operations that occurred prior to the group handshake. The pairwise key 146 may include the KEK and the KCK. The first device 104 may transmit, to the second device 106, a first message including the EAPOL key frame that has the second group key 142. (or the candidate key set 140) The EAPOL key frame may be encrypted based on the KEK of the pairwise key 146 and integrity protected based on the KCK of the pairwise key 146. The first device 104 may receive a second message from the second device 106. The second message may include an acknowledgement message and may indicate that the second device 106 has received the second group key 142.

In another particular implementation, the key delivery message 180 may include or correspond to a NAN management frame, which may be used to exchange a candidate group key between two devices of the data link group using unicast messages. The NAN management frame may encapsulate (or include) an EAPOL key frame. The NAN management frame, the EAPOL key frame, or both, may be encrypted based on the KEK and integrity protected based on the KCK. For example, the first device 104 may transmit the key delivery message 180 as a NAN management frame that includes the EAPOL key frame that has at least one key of the candidate key set 140, such as the second group key 142. The first device 104 may transmit the NAN management frame to another device associated with the first device 104, such as the second device 106.

In another particular implementation, the key delivery message 180 may include or correspond to a public action frame, which may be used to exchange a candidate group key between two devices of the data link group using unicast messages. The public action frame may be protected using a temporal key (TK). The TK may be included in a pairwise key. A particular attribute (e.g., a particular field) of the public action frame may be specified to carry the group key.

For example, a first attribute of public action frames may be specified to carry group keys, such as in one or more wireless communication standards. The first device 104 may transmit the key delivery message 180 as a public action frame that includes at least one key of the candidate key set 140, such as the second group key 142, in the first attribute of the public action frame. The key delivery message 180 may be transmitted to another device associated with the first device 104, such as the second device 106.

In some implementations, the first device 104 does not transmit an announcement message, such as the announcement message 160. In these implementations, in response to generating the second group key 142, the first device 104 may transmit the paging message 165 to neighboring devices of the data link group. As described above, the paging message 165 may be transmitted during a paging window of the first wireless channel (the NAN communication channel) or the second wireless channel (the data link group channel). In these implementations, the paging message 165 includes a page attribute 169 that indicates generation of the second group key 142. Details of the page attribute 169 are further described herein with reference to FIG. 6. In some implementations, the paging message 165 may also include the group ID 164, the device ID 166, the key indicator 168, or a combination thereof. Announcing group keys using paging messages instead of using announcement messages, such as the announcement message 160, may reduce traffic on the first wireless channel, the second wireless channel, or both.

In response to receiving the paging message 165, the second device 106 may transmit the trigger message 167 to the first device 104, as described above. The first device 104 may transmit the key delivery message 180, including the second group key 142, to the second device 106 in response to receiving the trigger message 167. After receiving the second group key 142, the second device 106 may transmit a paging message to the third device 108, and the second device 106 and the third device 108 may exchange trigger messages and key delivery messages, as described with reference to the first device 104 and the second device 106. Additionally, the second device 106 may send an acknowledgment (ACK), such as a MAC ACK, to the first device 104 in response to receiving the key delivery message 180 (including the second group key 142). Additionally, since paging messages may be multicast and may be unencrypted, neighboring devices that are unassociated with the first device 104, such as the fourth device 110, may receive the paging message 165 and may attempt to associate with the first device 104 to receive data associated with the paging message 165, such as at least one key of the candidate key set 140, (e.g., the second group key 142).

The paging message 165 may be retransmitted, or repeated, during multiple paging windows. For example, the first device 104 may transmit the paging message 165 during multiple paging windows until the first group key 132 expires. In some implementations, the first device 104 may stop transmitting the paging message 165 prior to expiration of the first group key 132 if each neighboring device in an associated state with the first device 104 has received the second group key 142. To illustrate, the first device 104 may transmit the paging message 165 during multiple paging windows until the second device 106 receives the second group key 142. The first device 104 may determine the second device 106 has received the second group key 142 based on receiving an ACK from the second device 106 in response to transmitting the key delivery message 180. Thus, the first device 104 may stop transmitting the paging message 165 if the first device 104 receives an ACK from each neighboring device of the data link group.

Additionally or alternatively, the group keys (the active key set 130 and the candidate key set 140) may be associated with a key index, a key identification number, or both. The key index, the key identification number, or both, may be included in a NAN service discovery frame, such as in a service information field, the key delivery message 180, or both. The key index, the key identification number, or both may indicate the active group key being used to encrypt traffic for the data link group. The key identification number may include a numerical value or an alphanumeric string that may be used to identify group keys. The key index may include a table of inactive group keys and the active group key. In some implementations, the table of the key index may include a key identification number for each inactive group key and the active group key.

The key index, the key identification number, or a combination thereof, may enable the devices of the data link group to determine the active group key. For example, a device that has left a particular data link group and later rejoins the particular data link group may determine if a previous active group key is still valid based on the key index, the key identification number, or a combination thereof. If the previous active group key is still valid, the device does not need to authenticate with another device of the data link group to receive the active group key of the data link group. As another example, during a transition from the first group key 132 to the second group key 142 as the active group key, a device may indicate which group key (e.g., the first group key 132 or the second group key 142) the device is using to encrypt data. For example, the first device 104 may include, in a message, the key identification number associated with the first group key 132 that the first device 104 is using to encrypt the data.

Although certain operations and functions of the system 100 have been described with respect to a corresponding device, each of the devices 104-110 may be configured to perform one or more operations, functions, or a combination thereof, described with reference to another of the devices 104-110. For example, each of the devices 104-110 may include corresponding key logic and corresponding message logic, as described with reference to the key logic 112 and the message logic 114, respectively, of the first device 104. Additionally or alternatively, although one or more examples have been described with respect to distribution of the second group key 142, such examples may be applied to distribution of one or more keys of the candidate key set 140.

One advantage provided by at least one of the disclosed aspects is a reduction in key-related traffic and overhead within a wireless network. For example, key-related traffic may be reduced by sending the announcement message 160 during a paging window or a discovery window when devices of the NAN are in the active operating mode (e.g., awake). Sending the announcement message 160 during the paging window or the discovery window may increase a likelihood that neighboring devices of the first device 104 receive the announcement message 160, which may reduce retransmissions. As another example, key-related traffic may be reduced by sending the paging message 165 having the page attribute 169 during a paging window when devices in the data link group are in the active operating mode. The page attribute 169 may indicate multiple devices that are scheduled to receive traffic from a particular device during an upcoming data window and may reduce a number of paging messages needed for group key propagation.

Another example advantage is that devices that receive the announcement message 160 (or a forwarded version thereof) may implement a waiting period until a predetermined time prior to expiration of an active group key. During the waiting period, a particular device that received the announcement message 160 (or a forwarded version thereof) may abstain (refrain) from initiating a security association procedure to obtain the second group key 142 corresponding to the announcement message 160 (or a forwarded version thereof). By abstaining from associating with another device for the purpose of acquiring the second group key 142, an amount of traffic corresponding to one or more devices performing security association procedures for the purpose of obtaining the second group key 142 may be reduced. As another example, an active distribution key, such as the first distribution key 134, may be used to encode (or encrypt) the second group key 142 and the encoded second group key may be sent (e.g., multicast) to one or more devices of the data link group. By sending the encoded second group key, the second group key 142 may be distributed to the one or more devices of the data link group without performing a security association procedure, P2P communications, or a combination thereof, between another device that has the second group key 142 and a device of the data link group that does not have the second group key 142.

Figure 2:
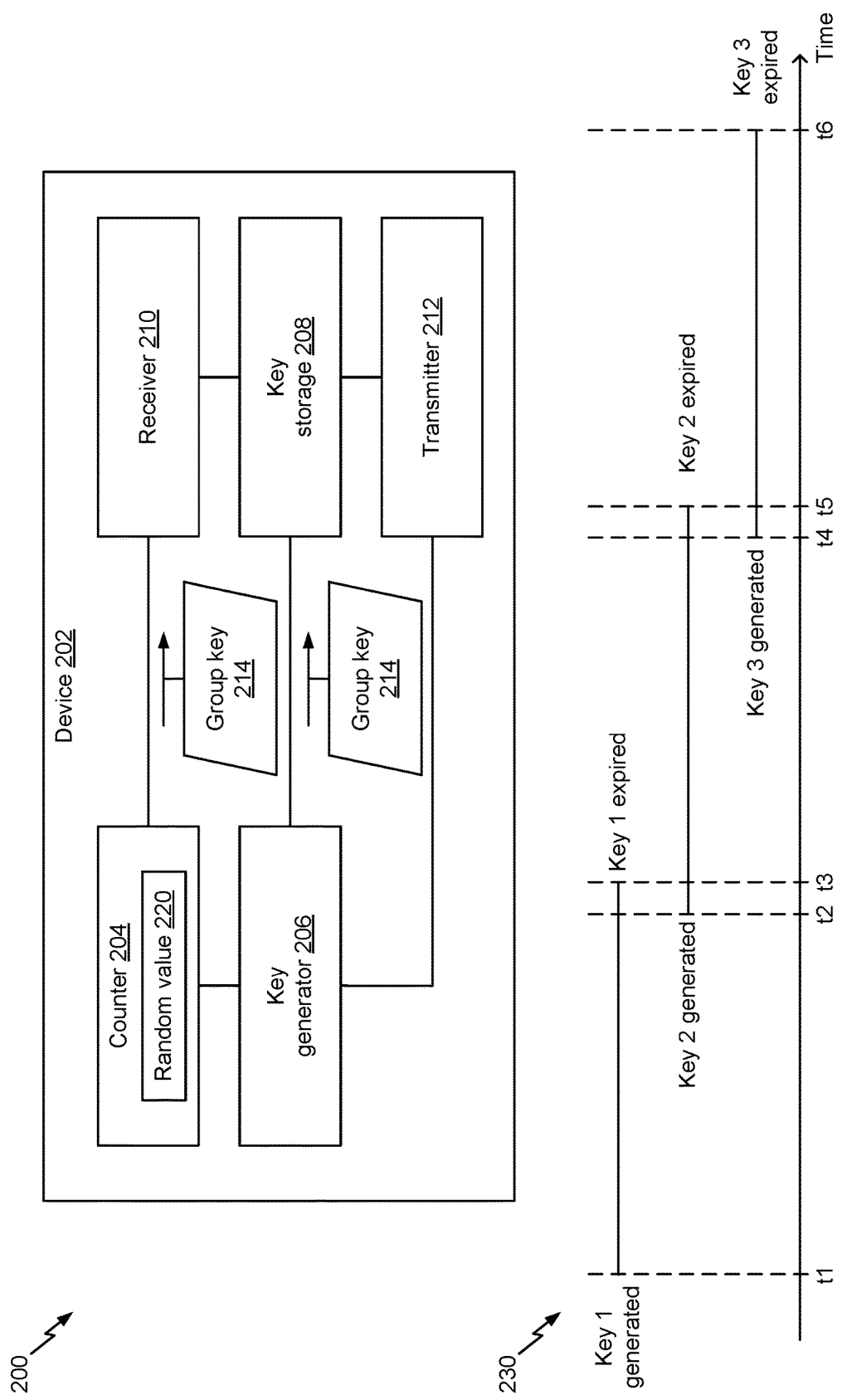
FIG. 2 is a block diagram of a device configured to generate a candidate group key.

FIG. 2 is a particular illustrative implementation of a system 200 that generates a candidate group key. The system 200 includes a device 202, such as a device included in a wireless network. The device 202 may include or correspond to one of the devices 104-110 of the wireless network 102 of FIG. 1.

The device 202 may include a counter 204, a key generator 206, key storage 208, a receiver 210, and a transmitter 212. The receiver 210 and the transmitter 212 may be configured to receive one or more signals from and to transmit one or more signals to other devices of a wireless network, respectively. In some implementations, the receiver 210 and the transmitter 212 may include a single component, such as a transceiver. The key storage 208 may include or correspond to a storage device, such as a memory. The counter 204 may be coupled to the key generator 206 and to the receiver 210, the key generator 206 may be coupled to the key storage 208 and to the transmitter 212, and the key storage 208 may be coupled to the receiver 210 and to the transmitter 212. In some implementations, the counter 204 may include or correspond to a timer.

The counter 204 may be configured to perform a countdown from a random value 220 prior to generation of the group key 214, as further described herein. The key generator 206 may be configured to generate one or more keys, such as a group key 214, a distribution key (not shown), a group integrity key, or a combination thereof, and to provide the one or more keys to the key storage 208 and to the transmitter 212. For example, the key generator may generate the group key 214 and provide the group key 214 to the key storage 208 and to the transmitter 212. The group key 214 may include or correspond to the first group key 132 or the second group key 142 of FIG. 1. The distribution key may include or correspond to the first distribution key 134 or the second distribution key 144 of FIG. 1. The key generator 206 may include hardware, software, or a combination thereof. In some implementations, the key generator 206 may include or correspond to a processor configured to execute one or more instructions included in a memory to generate the group key 214.

The key storage 208 may be configured to store one or more keys, such as the group key 214, the distribution key, a pairwise key, a group integrity key, or a combination thereof. As another example, the key storage 208 may store one or more previous group keys, such as one or more expired group keys of the data link group, or one or more candidate group keys generated by another device and received at the device 202 via the receiver 210.

During operation, the key generator 206 may initiate formation of the group key 214. In a particular implementation, the key storage 208 may store a previous group key (e.g., an active group key), and the key generator 406 may initiate formation of the group key 214 based on detecting a particular predetermined amount of time before expiration of the active group key (e.g., the previous group key that is set as the active group key is approaching expiration). For example, the particular predetermined amount of time may be detected by the counter 204, the key generator 206, or a combination thereof, based on timing information associated with the active group key. The particular predetermined amount of time may be selected such that the amount of time remaining before expiration of the active group key is sufficient for a candidate group key to be generated and propagated to each device of the data link group prior to expiration of the active group key.

FIG. 2 also illustrates timing corresponding to expiration of group keys (e.g., active group keys) of a data link group in a timing diagram 230. As illustrated, a first group key (Key 1) may be generated at time t1 (or generation may be initiated). The first group key (Key 1) may be set as the active group key at time t1 or shortly after time t1. A timestamp corresponding to the first group key (Key 1) may be generated and included in a message, such as the key delivery message 180 of FIG. 1, with the first group key (Key 1) when the first group key (Key 1) is transmitted among devices of a data link group.

At time t2, generation of a second group key (Key 2) is initiated. In some implementations, the time t2 may be associated with the particular predetermined amount of time before expiration of the first group key (Key 1) (or an amount of time after generation of the first group key (Key 1)). At time t3, the first group key (Key 1) expires. Although illustrated as being generated at the time t2, in other examples, generation of the second group key (Key 2) may be initiated at time t2, and the generation of the second group key (Key 2) may occur at some time between the time t2 and the time t3. After generation of the second group key (Key 2), the second group key (Key 2) may be provided to one or more devices of the data link group prior to the expiration of the first group key (Key 1). The second group key (Key 2) may be a first candidate group key and may correspond to the candidate key set 140 of FIG. 1. The second group key (Key 2) may become the active group key during a time period between time t2 and time t3. In a particular implementation, the second group key (Key 2) is set as the active group key at time t3.

Generation of a third group key (Key 3) may be initiated at time t4, which corresponds to the particular predetermined amount of time before expiration of the second group key (Key 2). The second group key (Key 2) may expire at time t5 and the third group key (Key 3) may be set as the active group key. Although not illustrated, a fourth group key may be generated prior to expiration of the third group key (Key 3) at the time t6. Additionally, although the particular predetermined amount of time has been described as being a same amount of time before expiration of each of the active group keys, in other implementations the particular predetermined amount of time may be different amounts of time before expiration for each of the active group keys.

The third group key (Key 3) may be a second candidate group key and may correspond to the candidate key set 140 of FIG. 1.

Referring to the device 202, in response to detecting the particular predetermined amount of time prior to expiration of an active group key, the key generator 206 may determine to initiate generation of the group key 214. The key generator 206 may initiate generation of the group key 214 by causing the counter 204 to initiate a countdown from the random value 220 (or to initiate the counter to count up to the random value 220). The random value 220 may be generated (or selected) from within a particular range of values stored at the device 202. For example, during manufacture the device 202 may be programmed with data indicating the particular range of values, such as a range of values corresponding to one or more standards. As another example, the device 202 may receive data indicating the particular range of values from another device of the data link group during a security association procedure (e.g., an association procedure) performed when the device 202 joins the data link group.

When the countdown reaches zero (or when counting up reaches the random value 220), the key generator 206 may generate the group key 214 and provide the group key 214 to the key storage 208, to the transmitter 212, or a combination thereof. Additionally, the key generator 206 may generate or initiate generation of an announcement message, such as the announcement message 160 of FIG. 1, and the key generator 206 may cause the announcement message to be transmitted by the transmitter 212 prior to transmission of the group key 214. The group key 214 may be stored in the key storage 208 as the active group key for use in encrypting group messages sent from the device 202 to other devices of the data link group, decrypting group messages received at the device 202 from other devices of the data link group, or a combination thereof. Additionally or alternatively, the group key 214 may be stored in the key storage 208 as a candidate group key and may later be set as the active group key. The group key 214 (and the announcement message) may be transmitted by the transmitter 212 to one or more other devices in the group (e.g., via single-hop or multi-hop routes). In some implementations, the announcement message may be sent after the countdown reaches zero (or counting up reaches the random value 220) and prior to generation of the group key 214.

The key generator 206 may be configured to prevent (e.g., prohibit) generation of the group key 414 when another announcement message or another group key is received prior to generation of the group key 214. For example, the counter 204 may stop the countdown if another announcement message or another candidate group key (e.g., an announcement message generated by a different device, a candidate group key generated by a different device, or a combination thereof) is received by the receiver 210. Additionally, if the group key 214 is generated and the device 202 receives a particular announcement message from another device indicating that another group key has been generated, the device 202 may apply suppression criteria to determine whether the group key 214 or the other group key is to be used as a potential "next" active group key after expiration of an existing active group key. For example, the suppression criteria may be applied to select a particular candidate group key that corresponds to an older timestamp or a candidate group key that was generated by a device having a higher value MAC address, as illustrative, non-limiting examples.

Although FIG. 2 illustrates a single device 202, each device in the data link group may be similarly configured as the device 202. Thus, any device in the data link group may generate a corresponding candidate group key to be used by other devices of the data link group. By enabling each device of the data link group to generate a corresponding candidate group key, the data link group may be able to exchange data without having a single central device configured to generate a candidate group key to be used by the devices of the data link group. Use of a single central device may be undesirable in a wireless network because each device (including the central device) may leave the wireless network at any time.

Figure 3:
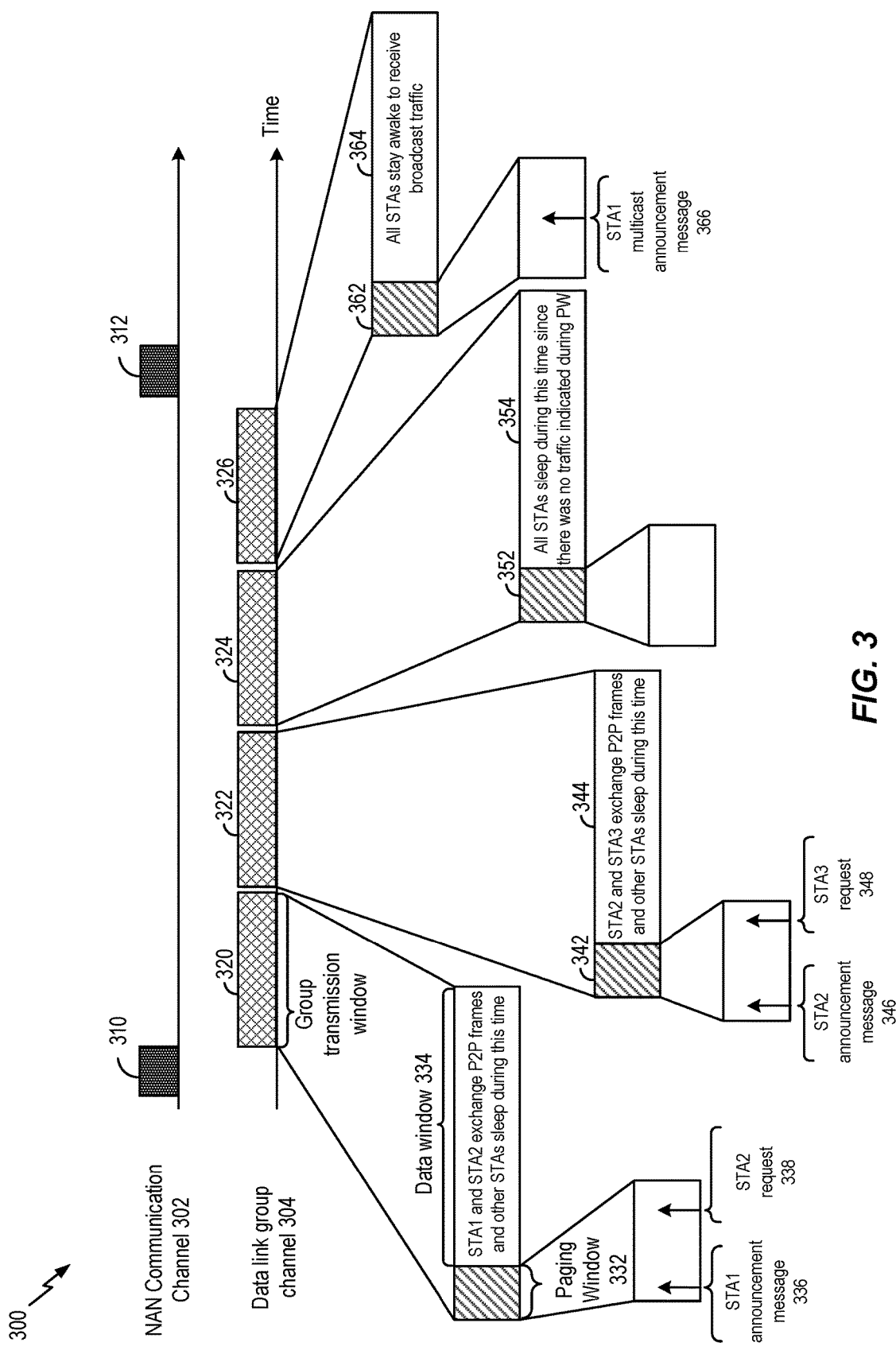
FIG. 3 is a timing diagram of an illustrative example of communication corresponding to a data link group.

FIG. 3 is a particular illustrative implementation of a timing diagram 300 of messages communicated in a data link group. The data link group may include or correspond to the data link group of FIG. 1 that includes the devices 104-110. The data link group may include multiple devices, such as a first device (STA1), a second device (STA2), and a third device (STA3). For example, the first device, the second device, and the third device may include or correspond to the devices 104-110 of FIG. 1 or the device 202 of FIG. 2.

The timing diagram 300 illustrates a NAN communication channel 302 and a data link group channel 304. The NAN communication channel 302 includes multiple discovery windows, such as a first discovery window 310 and a second discovery window 312. The data link group channel 304 includes multiple group transmission windows 320-326. In some implementations, the group transmission windows 320-326 occur with reference to the NAN communication channel 302. For example, when there is no data link group channel 304, the group transmission windows 320-326 occur with reference to the NAN communication channel 302 and may be between the first discovery window 310 and the second discovery window 312.

In other implementations, the data link group channel 304 may include discovery windows (similar to the discovery windows 310, 312) and the group transmission windows 320-326 occur between two discovery windows of the data link group channel 304. In some implementations, the discovery windows of the data link group channel 304 may be in addition to the first discovery window 310 and the second discovery window 312 of the NAN communication channel 302. In other implementations, there may be no NAN communication channel 302. In these implementations, the data link group channel 304 may or may have corresponding discovery windows.

In some implementations, the data link group may be included in a NAN and the devices of the data link group may communicate via the NAN communication channel 302. The devices of the NAN may be synchronized via one or more synchronization beacons that are communicated by a master device of the NAN or by a master device of a particular group of the NAN. For example, one of the devices of the data link group may operate as the master device and may broadcast one or more synchronization beacons to other devices included in the NAN via the NAN communication channel 302.

Additionally or alternatively, the devices included in the data link group may communicate via the data link group channel 304. The devices of the data link group may be synchronized via one or more synchronization beacons that are communicated by a master device of the data link group or a master device of a NAN that includes the data link group. For example, one of the devices of the data link group may operate as the master device and may broadcast one or more synchronization beacons to other devices of the data link group, other devices of the NAN, or a combination thereof, via the NAN communication channel 302, the data link group channel 304, or both.

The devices may be synchronized to detect group transmission windows corresponding to the data link group channel 304. For example, each of the devices of the data link group may have synchronized clocks, as described by the IEEE 802.11s standard, a Wi-Fi Alliance standard, or a combination thereof, to enable correct determinations of beginnings and endings of group transmission windows, paging windows, data path windows, or a combination thereof, as described further herein. The group transmission windows may include a first group transmission window 320, a second group transmission window 322, a third group transmission window 324, and a fourth group transmission window 326. Each of the data path transmission windows may include a corresponding paging window and a corresponding data window. To illustrate, the first group transmission window 320 may include a first paging window 332 and a first data window 334, the second group transmission window 322 may include a second paging window 342 and a second data window 344, the third group transmission window 324 may include a third paging window 352 and a third data window 354, and the fourth group transmission window 326 may include a fourth paging window 362 and a fourth data window 364.

In some implementations, each group transmission window includes an offset from a discovery window of the NAN communication channel, such as a first discovery window 310. The devices may determine a beginning or an end of the group transmission windows, the paging windows, or the data path windows based on offsets from the first discovery window 310. A duration between the first discovery window 310 and a second discovery window 312 may include or correspond to the group key update window.

During a discovery window, each of the devices of the data link group may be awake (e.g., not in a power-save, low power, or sleep mode) and may monitor for beacons, messages, or both. In some implementations, the beacons, the messages, or both may indicate traffic to be sent during a subsequent data window. Beacons, messages, or a combination thereof, sent during the discovery window may be secure (e.g., encoded or encrypted) or un-secure (e.g., un-encoded or unencrypted). When a secure beacon, a secure message, or both, are transmitted during the discovery window, the secure beacon, the secure message, or both, may be encoded using a key, such as an active group key, an active distribution key, or an integrity group key. For example, the active group key and the active distribution key may include or correspond to the first group key 132 of FIG. 1 and the first distribution key 134 of FIG. 1, respectively. The integrity group key may include or correspond to integrity group key of FIG. 1. If a particular device determines, based on beacons, messages, or both received during the discovery window, that the particular device may receive data, the particular device may stay awake during the subsequent data window. If the particular device does not receive a beacon, a message, or both during the discovery window, the particular device "goes to sleep" (e.g., enters a sleep mode or power-save mode) during the subsequent data window.

During a paging window, each of the devices of the data link group may be awake (e.g., not in a power-save, low power, or sleep mode) and may monitor for beacons, messages, or both. In some implementations, the beacons, the messages, or both may indicate traffic to be sent during a subsequent data window. Beacons, messages, or both, sent during the paging window may be secure (e.g., encoded or encrypted) or un-secure (e.g., un-encoded or unencrypted). When a secure beacon, a secure message, or both are transmitted during the paging window, the secure beacon, the secure message, or both may be encoded using a key, such as an active group key, an active distribution key, or a pairwise key. For example, the active group key and the active distribution key may include or correspond to the first group key 132 of FIG. 1 and the first distribution key 134 of FIG. 1, respectively. The pairwise key may include or correspond to the pairwise key 146 of FIG. 1. If a particular device determines, based on the beacons, the messages, or a combination thereof, received during the paging window, that it may receive data the particular device may stay awake during the subsequent data window. If the particular device does not receive a beacon, a message, or both, during the paging window, the particular device "goes to sleep" (e.g., enters the sleep mode or the power-save mode) during the subsequent data window.

Referring to the first paging window 332 of the first group transmission window 320, the first device may transmit an announcement message 336 via the data link group channel 304 to one or more devices of the data link group. The announcement message 336 may indicate that the first device has a candidate group key, such as the second group key 142 of FIG. 1 or the group key 214 of FIG. 2, to be distributed to the devices of the data link group. For example, the announcement message 336 may include or correspond to the announcement message 160 or the announcement message 170 of FIG. 1. In response to the announcement message 336, the second device may send a request 338 to the first device to request the candidate group key. Although the request 338 is illustrated as being sent during the same paging window as the announcement message 336, in other implementations the request 338 may be sent from the second device during a later paging window or a discovery window.

During the first data window 334 and responsive to the request 338, the first device and the second device may perform P2P communication to enable the first device to send the candidate group key to the second device. Other devices of the data link group may not be awake (e.g., in a sleep mode or in a power-save mode) during the first data window 334.

During the second paging window 342, the second device may transmit an announcement message 346 via the data link group channel 304 to one or more devices of the data link group. For example, the announcement message 346 may be based on the announcement message 336 issued by the first device or may be a forwarded version of the announcement message 336 issued by the first device. In response to the announcement message 346, the third device may send a request 348 to the second device to request the candidate group key. During the second data window 344, the second device and third second device may perform P2P communication to enable the second device to send the candidate group key to the third device. Other devices, such as the first device, of the data link group may not be awake (e.g., in a sleep mode or in a power-save mode) during the second data window 344.

During the third paging window 352, no beacons or messages may be communicated. Accordingly, during the third data window 354, all of the devices of the data link group may not be awake. During the fourth paging window 362, the first device may transmit a multicast announcement message 366 to one or more devices of the data link group. Accordingly, all of the devices of the data link group that received the announcement message 366 may be awake during the fourth data window 364 to enable the first device to multicast a message to other devices of the data link group.

Thus, FIG. 3 illustrates how devices may send beacons, messages, or a combination thereof, during paging windows or discovery windows to inform other devices of the data link group of data traffic to be transmitted. By informing other devices of the data traffic to be transmitted, one or more devices that are not intended to receive the data traffic may not be awake (e.g., enter a sleep mode or a power-save mode) during a data window and, thus, conserve power.

Figure 4:
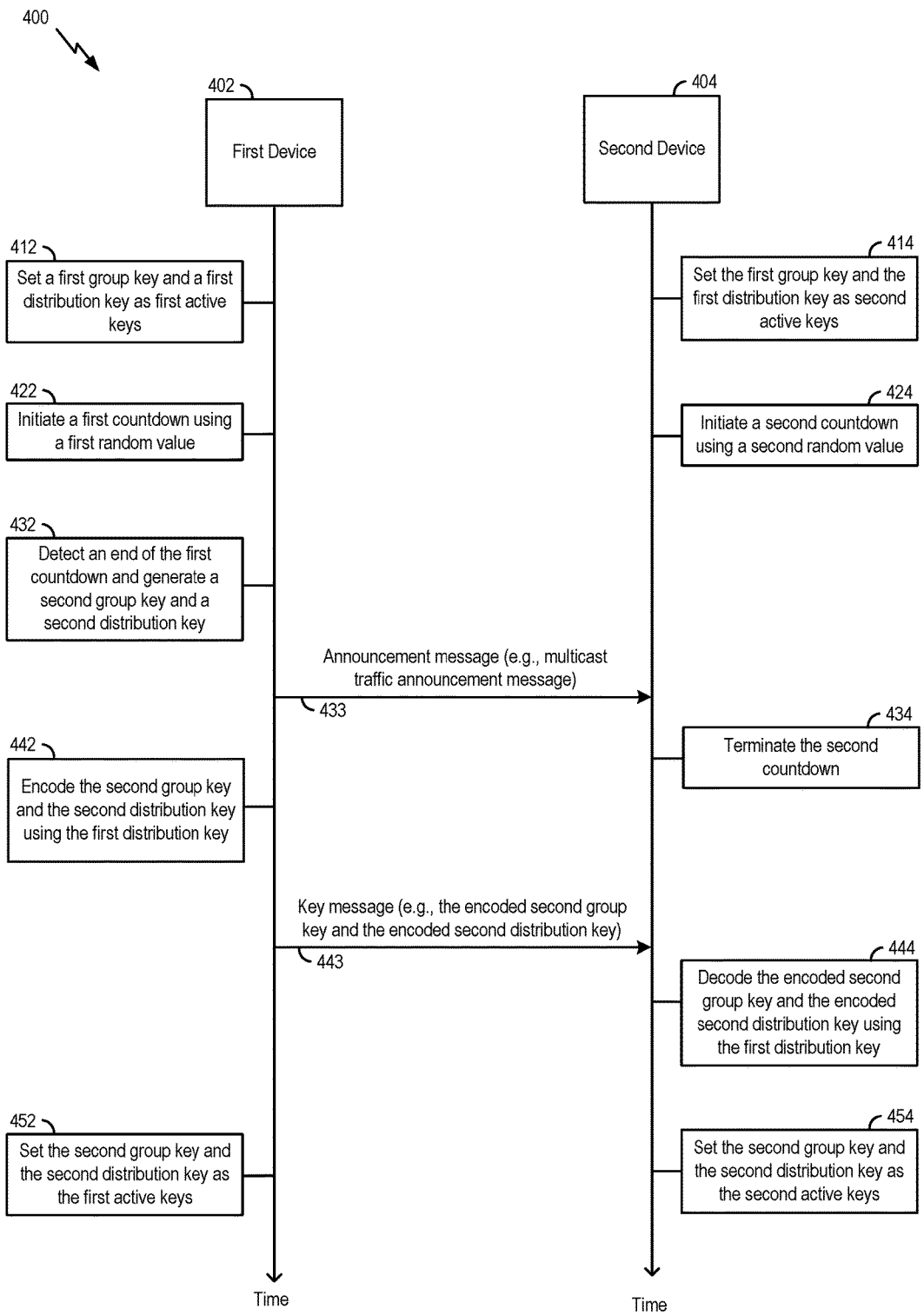
FIG. 4 is a ladder diagram of an illustrative method of using a distribution key.

Referring to FIG. 4, an illustrative implementation of a method 400 of communicating between a first representative device 402 and a second representative device 404 is shown. The method 400 is illustrated by a ladder diagram. The first device 402 and the second device 404 may be included in the same data link group, such as the same data link group of a NAN. For example, the first device 402 and the second device 404 may include or correspond to the devices 104-110 of FIG. 1, the device 202 of FIG. 2, or devices described with reference to FIG. 3. Although the data link group is described as including two devices (e.g., the first device 402 and the second device 404), in other implementations the data link group may include more than two devices.

The first device 402 may set a first group key and a first distribution key as first active keys (e.g., a first active key set) of the first device 402, at 412. The first group key and the first distribution key may include or correspond to the first group key 132 and the first distribution key 134 of FIG. 1, respectively. The second device 404 may set the first group key and the first distribution key as second active keys (e.g., a second active key set) of the second device 404, at 414. The first device 402 may set the first active keys before, after, or at the same time that the second device 404 sets the second active keys.

The first device 402 may initiate a first countdown using a first random value, at 422, and the second device 404 may initiate a second countdown using a second random value, at 424. For example, the first random value, the second random value, or both, may include or correspond to the random value 220 of FIG. 2. The first countdown may correspond to a candidate group key (e.g., a candidate key set) generation procedure performed at the first device 402 and the second countdown may correspond to a candidate group key generation procedure performed at the second device 404. The first device 402 may initiate the first countdown before, after, or at the same time that the second device 404 initiates the second countdown.

The first device 402 may detect an end of the first countdown and generate a second group key and a second distribution key, at 432. For example, the first device 402 may detect the end of the first countdown based on a value of a counter, such as the counter 204 of FIG. 2. The second group key may include or correspond to the second group key 142 of FIG. 1 or the group key 214 of FIG. 2. The second distribution key may include or correspond to the second distribution key 144 of FIG. 1. To generate the second group key and the second distribution key, the first device 402 may include one or more key generators, such as the key logic 112 of FIG. 1 or the key generator 206 of FIG. 2.

The first device 402 may send an announcement message to the second device 404, at 433. For example, the announcement message may include or correspond to the announcement message 160 of FIG. 1. The announcement message may indicate to the second device 404 that the first device 402 has the second group key to be distributed. In some implementations, the announcement message may include a multicast message, such as a multicast traffic announcement message. Although the announcement message is described as being sent after the second group key is generated, in other implementations the announcement message may be sent after the end of the first countdown is detected and before the second group key is generated.

The second device 434 may terminate the second countdown, at 434. For example, the second device 434 may suppress a candidate group key generation procedure in response to receiving the announcement message from the first device 402.

The first device 402 may encode (or encrypt) the second group key and the second distribution key using the first distribution key, at 442. The first device 402 may send a key delivery message to the second device 404, at 443. For example, the key delivery message may include or correspond to the key delivery message 180 of FIG. 1. The key delivery message may include the encoded (or encrypted) second group key and the encoded (or encrypted) second distribution key. In some implementations the first device 402 may send the key delivery message to the second device 404 as a multicast message that may be received by devices of the data link group that are associated with or unassociated with the first device 402. Although the encoded (or encrypted) second group key and the encoded (or encrypted) second distribution key are described as being include in a single key delivery message, in other implementations the encoded (or encrypted) second group key and the encoded (or encrypted) second distribution key may be sent in separate messages.

The second device 404 may decode (or decrypt) the encoded (or encrypted) second group key and the encoded (or encrypted) second distribution key using the first distribution key, at 444. The first device 402 may set the second group key and the second distribution key as the first active keys, at 452, and the second device 404 may set the second group key and the second distribution key as the second active keys, at 454. Although described as using distribution key, in other implementations distribution keys may not be used to encode (or encrypt) candidate group keys. For example, the first device 402 may encode (or encrypt) the second group key based on the first group key.

By using the second first distribution key to encode (or encrypt) the second group key, the first device 402 may encode (or encrypt) the second group key and distribute the second group key to one or more devices (e.g., the second device 404) of the data link group as a multicast message. Because the first distribution key is known to each device (e.g., the second device 404) of the data link group, the multicast message may be used to send the encoded (or encrypted) second group key directly to the one or more devices regardless of whether the one or more devices are associated with or unassociated with the first device 402. Accordingly, no additional security association procedures, P2P communications, or a combination thereof are performed by the first device with other devices of the data link group for the purpose of distributing the second group key. Thus, when the distribution keys are used by the data link group, an amount of data traffic distribute the second group key may be reduced as compared when the distribution keys are not used to distribute the second group key.

Figure 5:
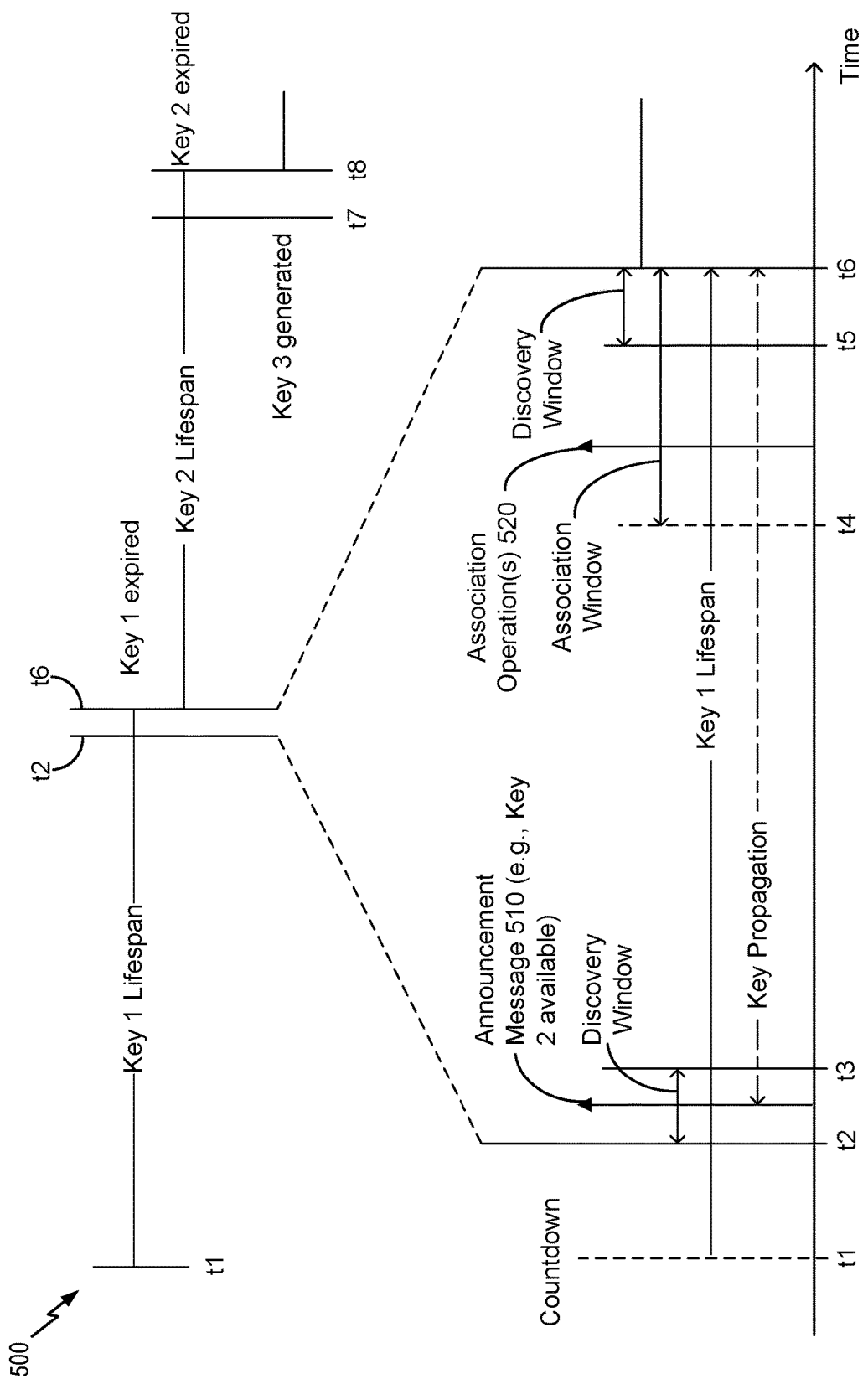
FIG. 5 is a timing diagram of an illustrative example of communication corresponding to a data link group.

Referring to FIG. 5, a particular illustrative timing diagram 500 illustrating communication within the data link group is depicted. FIG. 5 illustrates lifespans and expirations of group keys (such as active group keys) of a data link group. Generation of a first group key (Key 1) may be initiated, or the first group key (Key 1) may be generated at time t0 (not shown). Generation of the first group key (Key 1) is described with reference to at least FIG. 2. A timestamp corresponding to the first group key (Key 1) may be generated and included in a message, such as the key delivery message 180 of FIG. 1. In a particular implementation, the key identifier 143 may include the timestamp. The timestamp may be included in the message with the first group key (Key 1) when the first group key (Key 1) is transmitted among devices of a data link group that corresponds to the first group key (Key 1). As illustrated, Key 1 becomes an active key at time t1. A device of the data link group may start a countdown at time t1. The countdown may indicate a lifetime of the first group key (Key 1), a time period until an association window, or other timing information. Although a single countdown is described, in some implementations multiple countdowns may be used. In other implementations, the countdown may start at a prior time, such as a time corresponding to the device receiving an announcement message.

During a discovery window that begins at time t2 and that ends at time t3, an announcement message 510 corresponding to a second group key (Key 2) is transmitted by a device of the data link group. The announcement message 510 may be transmitted in response to a device of the data link group generating the second group key (Key 2). The announcement message 510 may include or correspond to the announcement message 160, the announcement message 170 of FIG. 1, or a combination thereof. Although described as an announcement message transmitted during a discovery window, in other implementations, the second group key (Key 2) may be announced by a paging message transmitted during a paging window of the data link group, as described with reference to FIGS. 1 and 3.

After the announcement message 510 is transmitted by a particular device, the particular device may transmit paging messages and key delivery messages to distribute the second group key (Key 2) to other devices of the data link group, as described with reference to FIG. 1. Additionally, devices that receive the second group key (Key 2) may also propagate the second group key (Key 2) to other devices, such that the second group key (Key 2) propagates throughout the data link group. However, one or more devices of the data link group may not have received the second group key (Key 2) at the beginning of an association window occurring at time t4. For example, a device may be multiple hops away from a key generator device and the second group key (Key 2) may not have reached the device, or the device may be unassociated with the particular device, and the particular device has not transmitted the second group key (Key 2) to the device at the beginning of the association window. The association window may correspond to a time where the one or more devices attempt to associate with a device of the data link group that has the candidate group key (Key 2), such as the first device 104 in FIG. 1.

The association window may begin at a predetermined time (an association threshold time) that is known to each device of the data link group. The association window may occur prior to expiration of the lifespan of the first group key (Key 1) at time t6 and may occur prior to the second group key (Key 2) being set as the active group key at or before time t6. In a particular implementation, the association threshold time is defined in a wireless communication standard, such as an IEEE 802.11 standard, a Wi-Fi Alliance standard, a NAN standard, or a combination thereof. In some implementations, the association threshold time may be indicated by a key delivery message, such as the key delivery message 180 of FIG. 1. For example, the association threshold time may be indicated by the key identifier 143. In other implementations, the association threshold time may be negotiated by devices of the data link group.

During the association window, one or more devices may perform association operations 520. As an illustrative example, with reference to FIG. 1, the fourth device 110 may send the association request 175 to the first device 104, and the first device 104 may send the association response 176 or the association rejection 178 to the fourth device 110 during the association window. At time t5, a second discovery window of the NAN begins. One or more announcement messages may be transmitted during the second discovery window. At time t6, the second discovery window ends. In some implementations, the association window ends at time t6 and includes the second discovery window, as illustrated in FIG. 5. In other implementations, the association window may end at time t5.

A time period from t2 to t6 may correspond to a group key update window. The group key update window may correspond to a period of time where one or more devices of the data link group distribute a candidate group key, such as the second group key (Key 2), to the devices of the data link. Key delivery messages (not illustrated) that include the second group key (Key 2) may be transmitted between devices of the data link group during the group key update window. For example, with reference to FIG. 1, the key delivery message 180 may be transmitted to devices of the data link group. Although illustrated as taking place between a start of a first discovery window and an end of a second discovery window, the group key update window may take place between multiple discovery windows. For example, the announcement message 510 may be transmitted (or retransmitted) during multiple discovery windows. Transmitting the announcement message 510 during multiple discovery windows may increase the likelihood that each device of the data link group receives the announcement message 510.

Generation of a third group key (Key 3) may be initiated at time t7, which may correspond to the particular predetermined amount of time before expiration of the second group key (Key 2). The second group key (Key 2) may expire at time t8. In some implementations, the duration of time between time t2 and time t6 is the same as the duration of time t7 and time t8. In other implementations, the duration of time between time t2 and time t6 is different than the duration of time t7 and time t8. In some implementations, the first group key (Key 1), the second group key (Key 2), and the third group key (Key 3) have the same lifespan. In other implementations, the first group key (Key 1), the second group key (Key 2), and the third group key (Key 3) have different lifespans.

Thus, FIG. 5 describes timing related to group keys and related announcement messages. Transmitting announcement messages during discovery windows may increase a likelihood that devices of a data link group are operating in an active operating mode and are able to receive the announcement messages. Additionally, one or more devices that have not received a candidate group key (e.g., a potential "next" active group key) by the start of an association window may have a designated time for performing association operations with other devices. The association operations may associate a device with another device that has the candidate group key, thereby enabling the device to receive the candidate group key. A duration of the association window may be set to achieve a target likelihood that each device of the data link group has time to associate with a device that has the candidate group key.

Figure 6:
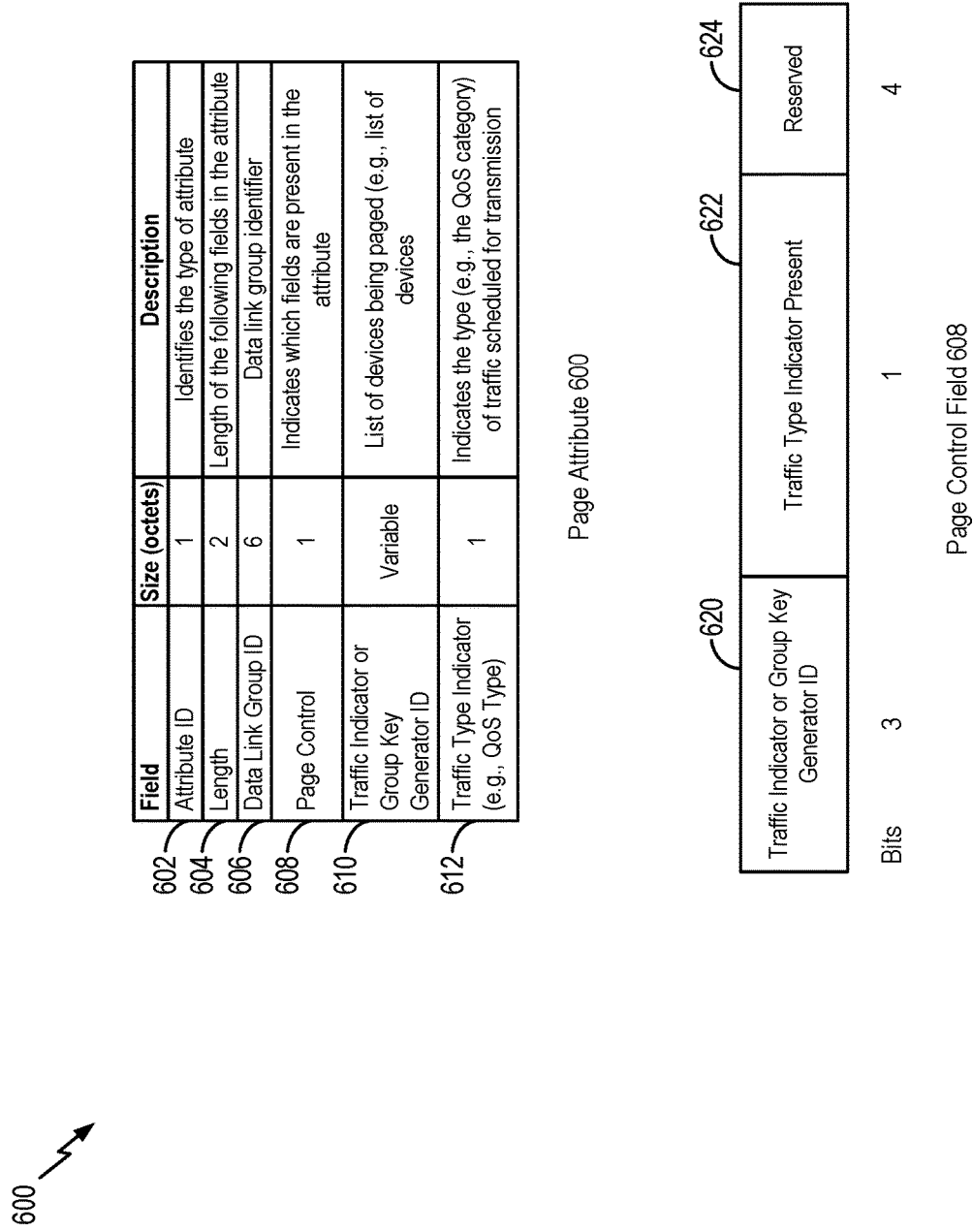
FIG. 6 is a diagram of an illustrative example of aspects of a page attribute field.

Referring to FIG. 6, a diagram of an illustrative page attribute 600 may be included in a paging message. In a particular implementation, the page attribute 600 may include or correspond to the page attribute 169 of FIG. 1. Although the page attribute 600 is illustrated in FIG. 6 as including particular fields, the illustration is not limiting. In other implementations, the fields of the page attribute 600 may be arranged in a different order and may include fewer fields or more fields than illustrated in FIG. 6.

The page attribute 600 may include an attribute ID field 602. The page attribute 600 may include a length field 604 that includes a value identifying a length of the page attribute 600. The page attribute 600 may also include a data link group ID field 606 that includes a value that identifies the data link group. The data link group ID field 606 may also be referred to as a NAN data link (NDL) identifier.

The page attribute 600 further includes a page control field 608 and a traffic indicator or group key generator ID field 610. The page attribute 600 optionally includes a traffic type indicator 612. The page control field 608 indicates information related to the page attribute 600. A first set of bits 620 of the page control field 608 may indicate whether the page attribute 600 includes a traffic indicator or a group key generator ID, as further described herein. Additionally, if a traffic indicator is included in the page attribute 600, the first set of bits 620 may indicate a type of the traffic indicator, as further described herein. In a particular implementation, the first set of bits 620 includes three bits. A second set of bits 622 of the page control field 608 may indicate whether the traffic type indicator 612 is included in the page attribute 600. A third set of bits 624 of the page control field 608 may be reserved. In other implementations, the bits in the page control field 608 may be divided differently.

To illustrate the indications provided by the first set of bits 620, if the first set of bits 620 has a first particular value, the data scheduled for transmission by the device that sends the paging message including the page attribute 600 is multicast data. In a particular implementation, if the data is multicast data, the traffic indicator or group key generator ID field 610 may not be included in the page attribute 600. In this case, each device that receives the paging message including the page attribute 600 may remain in an active operating mode based on detecting that the first set of bits 620 of the page control field 608 has the first particular value. If the first set of bits 620 has a second particular value, a third particular value, or a fourth particular value, the traffic indicator or group key generator ID field 610 includes a traffic indicator. If the first set of bits 620 has the second particular value, the data may be unicast data and the traffic indicator may be represented by a traffic indicator map (TIM). If the first set of bits 620 has the third particular value, the data may be unicast data and the traffic indicator may be represented by a Bloom filter. If the first set of bits 620 has the fourth particular value, the data may be unicast data and the traffic indicator may be represented by a list of MAC addresses. If the first set of bits 620 has a fifth particular value, the traffic indicator or group key generator ID field 610 includes a group key generator ID. In this case, the first set of bits 620 indicates an identifier of a device that has generated a candidate group key. In this case, the group key generator ID includes a MAC address (or other identifier) of the device that generated the candidate group key, and if the traffic type indicator 612 is included in the page attribute 600, the traffic type indicator 612 indicates a highest priority traffic type.

For example, the traffic type indicator 612 may indicate a highest quality of service (QoS) category corresponding to the traffic.

If the page attribute 600 includes a traffic indicator, the traffic indicator has a variable size and indicates a subset of devices that are scheduled to receive traffic from a particular device during an upcoming data window. The traffic indicator may be represented by a TIM, a Bloom filter, or a list of MAC addresses. The traffic indicator may identify each device scheduled to receive traffic, such as traffic from the first device 104 of FIG. 1. In some implementations, a paging message may include multiple page attributes 600. For example, a paging message may include a first page attribute indicating a group key generator ID (based on the traffic indicator or group key generator ID field 610 and the page control field 608) and a second page attribute corresponding to other data scheduled for transmission to one or more devices of the data link group.

Thus, FIG. 6 illustrates a page attribute 600 that may be included in a frame, such as a service discovery frame (SDF), a public action frame (as described in IEEE 802.11), a management frame, or a NAN management frame, to indicate a list of devices that are scheduled to receive traffic or to indicate an ID of a key generator device. Additionally or alternatively, the page attribute 600 may be included in a paging message to announce generation of a candidate group key.

Figure 7:
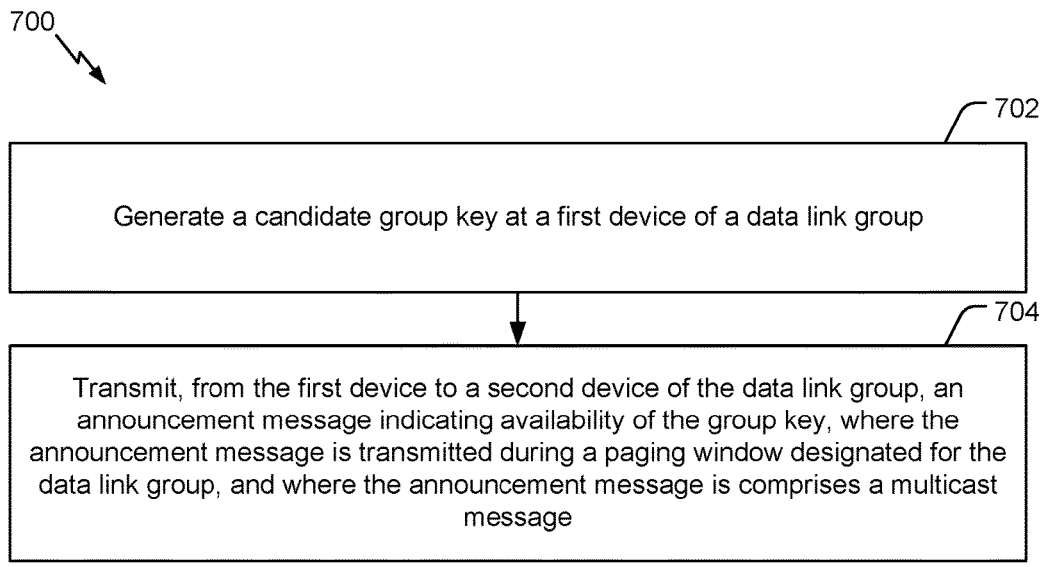
FIG. 7 is a flow diagram of a first illustrative method of operation at a device of a data link group.

Referring to FIG. 7, a first implementation of a method 700 of operation at a device of a data link group is shown. The data link group may include an infrastructure-less peer-to-peer network. For example, the data link group may include multiple devices of a NAN or a wireless mesh network. The multiple devices may form data connectivity amongst themselves (e.g., amongst the multiple devices). The method 700 may be performed at any of the devices 104-110, the device 202 of FIG. 2, any of the devices described with reference to FIG. 3, or either of the devices 402, 404 of FIG. 4.

The method 700 includes generating a candidate group key at a first device of a data link group, at 702. For example, the candidate group key may include or correspond to the second group key 142 of FIG. 1 or the group key 214 of FIG. 2. The candidate group key may be set as the active group key to enable encryption, decryption, or both, of group addressed data messages corresponding to the data link group. The second group key 142 may be generated by the first device 104, as described with reference to FIG. 1.

The method 700 includes transmitting, from the first device to a second device of the data link group, an announcement message indicating availability of the candidate group key, where the announcement message is transmitted during a paging window designated for the data link group, and where the announcement message includes a multicast message, at 704. For example, the paging window may be part of a group transmission window. To illustrate, the paging window may be one of the paging windows 332, 342, 352, 362 of FIG. 3. The announcement message may include or correspond to the announcement message 160 or the announcement message 170 of FIG. 1.

In some implementations, the announcement message may be transmitted in response to generating the candidate group key. For example, the announcement message may be transmitted in response to the first device receiving the candidate group key from another device of the data link group. As another example, the announcement message may be transmitted in response to the first device initiating generation of the candidate group key or in response to the first device generating the candidate group key. The multicast message (e.g., the announcement message) may include one or more bits that indicate the announcement message is a group key announcement message. For example, the one or more bits may include or correspond to the flag 162 of FIG. 1. The one or more bits may be included in a particular field of the announcement message. The announcement message may also include a group identifier of the data link group and a device identifier of a particular device that generated the candidate group key. In some implementations, the first device and the particular device are the same device and, in other implementations the first device and the particular device are different devices. The group identifier and the device identifier may include or correspond to the group identifier 164 and the device identifier 166, respectively, of FIG. 1. The device identifier may be a MAC address of the particular device. Additionally, the announcement message may include a timestamp associated with generation of the candidate group key by the particular device.

In some implementations, the first device may send a second multicast message that includes the candidate group key subsequent to sending the announcement message. The second multicast message may be protected using a distribution key, such as the first distribution key 134 of FIG. 1. Each device of the data link group includes a corresponding copy of the distribution key. The distribution key may be configured to only be used to encode, decode, or both, the second multicast message that includes the candidate group key.

In some implementations, the first device may be associated with a second device of the data link group when the first device transmits the announcement message. For example, when the first device is the first device 104 of FIG. 1, the second device may be the second device 106 of FIG. 1. The first device may receive a request from the second device to send the candidate group key from the first device to the second device. The first device may send the candidate group key to the second device after encrypting the candidate group key using a pairwise key that corresponds to the first device being associated with the second device. For example, the pairwise key may be generated during a security association procedure performed between the first device and the second device. The pairwise key may enable secure communication between the first device and the second device after the security association procedure. The pairwise key may include or correspond to the pairwise key 146 of FIG. 1.

In other implementations, after transmitting the announcement message, the first device may receive a request for the first device to associate with a third device of the data link group. For example, the third device may include or correspond to the fourth device 110 of FIG. 1. The first device may make a security association with the third device and a pairwise key corresponding to the first device and the third device may be generated (e.g., established) during the security association. After completion of the security association, the first device may receive a second request for the first device to send the candidate group key to the third device. Alternatively, after completion of the security association, the first device may automatically send the candidate group key to the third device.

In some implementations, the first device may receive a message from a fourth device after the announcement message is transmitted. The message may indicate that that the message is a second group key announcement message. The message may correspond to a second candidate group key generated by a particular device of the data link group. The particular device and the second device may be the same device or the particular device and the second device may be different devices. When the particular device and the second device are different devices, the second device may be one hop away from the first device and the particular device may be multiple hops away from the first device. In some implementations, the second candidate group key may supersede the active group key generated by the first device. Prior to receiving the second candidate group key, the first device may send a multicast request to one or more devices of the data link group. Responsive to the multicast request, the first device may receive the second candidate group key from a particular device of the data link group.

In response to a determination that the first device is unassociated with the particular device that has the candidate group key, the first device may identify a fifth device of the data link group that is associated with the first device and that has the candidate group key. The first device may identify the fifth device during a time period that ends prior to expiration of an active group key, such as the first group key 132 of FIG. 1, of the data link group. The time period may begin after the second announcement message is received and may end at a predetermined time before the expiration of the active group key. For example, the first device may identify the fifth device as having the candidate group key responsive to a particular message received at the first device from the fifth device. The particular message may be received subsequent to the second announcement message being received at the first device and prior to an end of the time period. The first device may request the candidate group key from the fifth device and may receive the candidate group key from the fifth device prior to the expiration of the active group key. In some implementations, the first device may be associated with the fifth device when the second announcement message is received and may be unassociated with the fifth device when the first device receives the candidate group key from the fifth device. For example, the fifth device may transmit the candidate group key to the first device as a multicast message using a distribution key.

The method 700 enables the distribution of a candidate group key to the devices of the data link group. The candidate group key may be distributed with a reduction in key-related traffic and overhead within a NAN that includes the data link group. For example, key-related traffic may be reduced by sending an announcement message, such as a group key announcement message, during a paging window when devices of the data link group are awake. As another example, an active distribution key may be used to encode the candidate group key and the encoded candidate group key may be sent as a multicast message to one or more devices of the data link group. By sending the candidate group key as a multicast message, the candidate group key may be distributed to the one or more devices of the data link group without performing a security association, P2P communications, or combination thereof, between the first device and another device of the data link group.

Figure 8:
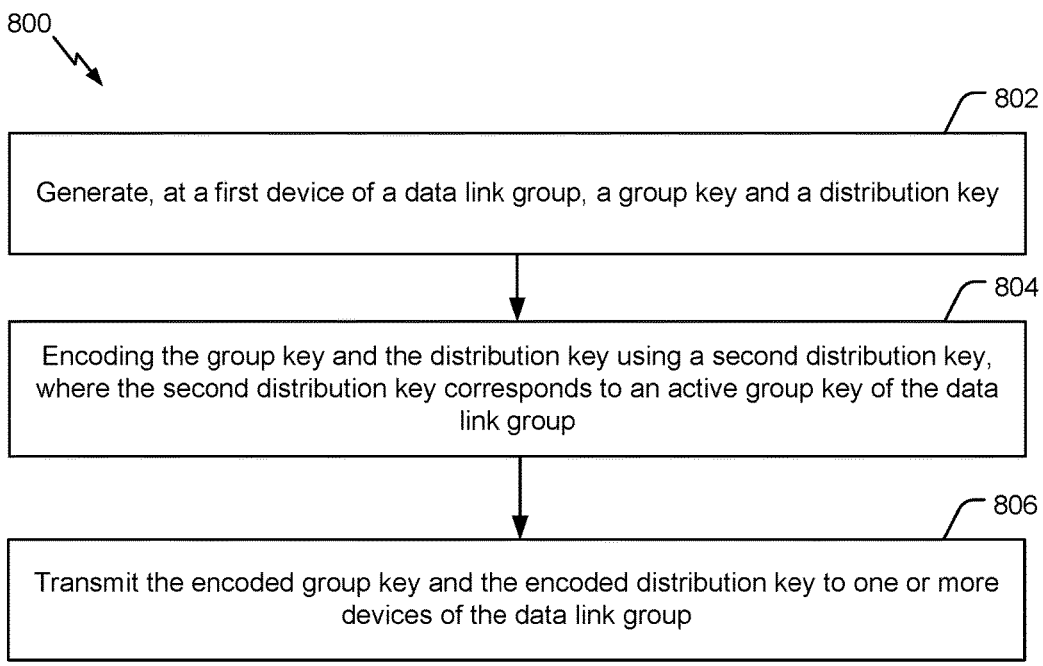
FIG. 8 is a flow diagram of a second illustrative method of operation at a device of a data link group.

Referring to FIG. 8, a second implementation of a method 800 of operation at a device of a data link group is shown. The method 800 include or correspond to a method for wireless communication and may be performed at any of the devices 104-110, the device 202 of FIG. 2, any of the devices described with reference to FIG. 3, or either of the devices 402, 404 of FIG. 4.

The method 800 may include generating, at a first device of a data link group, a group key and a distribution key, at 802. For example, the group key and the distribution key may include or corresponds to the second group key 142 and the second distribution key 144 of FIG. 1.

The method 800 may include encoding the group key and the distribution key using a second distribution key, where the second distribution key corresponds to an active group key of the data link group, at 804. For example, the second distribution key may include or correspond to the first distribution key 134 of FIG. 1. In some implementations, the second distribution key may correspond to the active group key (e.g., may be part of a set of keys, such as an active key set) and the second distribution key may be usable to encode and decode key delivery messages until the group key is set as the active group key.

The method 800 further includes transmitting the encoded group key and the encoded distribution key to one or more devices of the data link group, at 806. In some implementations, the encoded group key and the encoded distribution key may be transmitted by multicasting the encoded group key and the encoded distribution key to multiple devices included in a NAN, such as the wireless network 102 of FIG. 1. Each device of the data link group may include the second distribution key and may be configured to decode the encoded group key and the encoded distribution key using the second distribution key.

In some implementations, prior to generating the group key and the distribution key, a second group key (e.g., a candidate group key) and the second distribution key may be received at the first device from another device of the data link group. For example, the second group key may include or correspond to the first group key 132 of FIG. 1. The first device may set the second group key as the active group key prior to generating the group key (e.g., generated while the second candidate group key is the active group key). The first device may set the group key as the active group key in response to detecting expiration of the second group key as the active group key. Accordingly, the group key may replace the second group key as the active group key of the data link group.

In some implementations, prior to encoding the group key and the distribution key, an announcement message, such as the announcement message 160 of FIG. 1, may be transmitted to the one or more devices. The announcement message may correspond to the group key. For example, the announcement message may indicate that group key is available for distribution. The announcement message may be transmitted during a paging window of a group transmission window. The group transmission window may include or correspond to one of the group transmission windows 320-326 of FIG. 3. The encoded group key and the encoded distribution key may be transmitted during a data window of the group transmission window or during another group transmission window that occurs subsequent to the group transmission window.

The method 800 enables an active distribution key (e.g., the first distribution key 134) to be used to encode the group key and the encoded group key may be sent as a multicast message to one or more devices of the data link group. By sending a multicast message that includes the group key (e.g., a candidate key available to be set as a "next" active group key), the group key may be distributed to the one or more devices of the data link group without making a security association, P2P communications, or combination thereof, between the first device and another device of the data link group.

Figure 9:
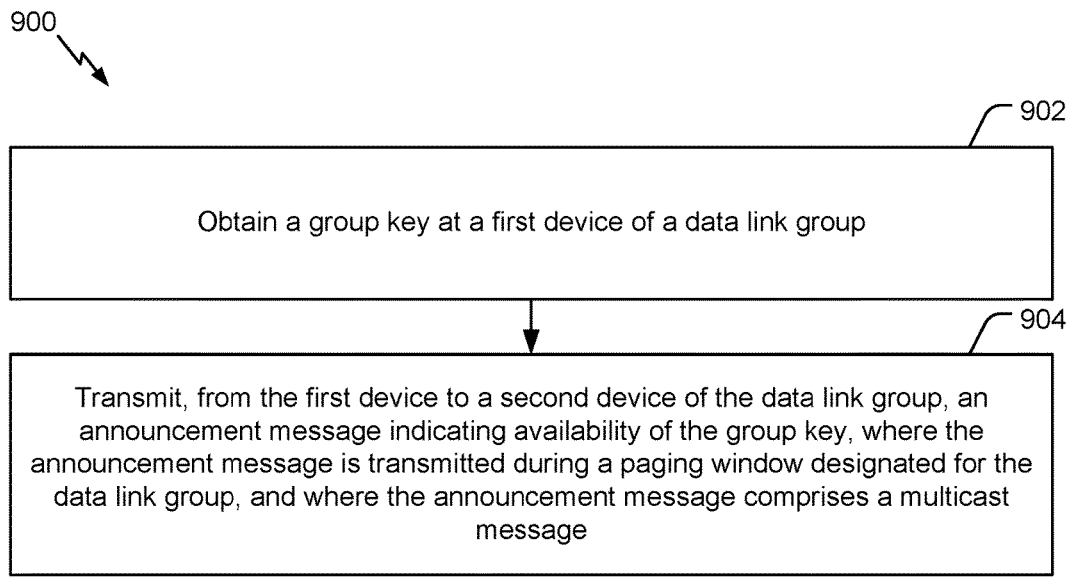
FIG. 9 is a flow diagram of a third illustrative method of operation at a device of a data link group.

Referring to FIG. 9, a third implementation of a method 900 of operation at a device of a wireless network is shown.

The method 900 may be performed at any of the devices 104-110 of FIG. 1, the device 202 of FIG. 2, any of the devices described with reference to FIG. 3, or either of the devices 402, 404 of FIG. 4.

The method 900 includes obtaining a candidate group key at a first device of a data link group, at 902. For example, with reference to FIG. 1, the first device 104 may obtain the second group key 142. The candidate group key may be set as the potential "next" active group key to enable encryption, decryption, or both, of group addressed data messages corresponding to the data link group. In some implementations, obtaining the candidate group key at the first device may include receiving the candidate group key from another device of the data link group. In other implementations, obtaining the candidate group key may include generating the candidate group key at the first device.

The method 900 includes transmitting, from the first device to a second device of the data link group, an announcement message indicating availability of the candidate group key, at 904. The announcement message may be transmitted during a paging window and via a wireless channel corresponding to the data link group. In some implementations, the announcement message may include a multicast message.

In some implementations, the announcement message may be transmitted in response to obtaining the candidate group key. For example, with reference to FIG. 1, the announcement message 160 may be transmitted in response to the first device 104 receiving the second group key 142 from another device of the data link group. As another example, the announcement message 160 may be transmitted in response to the first device 104 initiating generation of the second group key 142 or in response to the first device 104 generating the second group key 142. The multicast message (e.g., the announcement message 160) may include one or more bits that indicate the announcement message is a group key announcement message. The one or more bits may be included in a particular field of the announcement message 160. The announcement message 160 may also include the group ID 164 of the data link group and the device ID 166 of a particular device that generated the second group key 142.

In some implementations, the first device may receive a trigger message from a second device of the data link group, where the second device is in an associated state with the first device. For example, the first device 104 may receive the trigger message 167 from the second device 106. The first device may transmit the candidate group key to the second device in response to receiving the trigger message. For example, the first device 104 may transmit the key delivery message 180 including the second group key 142 to the second device 106. The candidate group key may be encrypted based on a pairwise key. The pairwise key may be generated during an association process between the first device and the second device. For example, the second group key 142 may be encrypted based on the pairwise key 146. In a particular implementation, the candidate group key is included in a key delivery message, and the key delivery message includes a key identifier indicating an expiration time of the candidate group key. For example, the key delivery message 180 may include the second group key 142 and the key identifier 143.

In some implementations, an active key set may include an active group key, an active distribution key, and an active group integrity key. For example, the active key set 130 may include the first group key 132, the first distribution key 134, and the first group integrity key 131 of FIG. 1. In some implementations, a candidate key set may include a candidate group key, a candidate distribution key, and a candidate group integrity key. For example, the candidate key set 140 may include the second group key 142, the second distribution key 134, and the second group integrity key 141 of FIG. 1.

In some implementations, the candidate group key may be encoded based on the active group key, the active distribution key (of the active key set), or the pairwise key. For example, the second group key 142 may be encrypted based on the first group key 132, the first distribution key 134, or the pairwise key 146. The key delivery message 180 (including the encrypted second group key 142) may be encrypted based on the first group key 132, the first distribution key 134, or the pairwise key 146. The method 900 may include transmitting the encoded candidate group key. The encoded candidate group key may be decoded based on the active group key, the active distribution key (of the active key set), or the pairwise key. For example, the second key 142 may be decrypted based on the first group key 132, the first distribution key 134, or the pairwise key 146. In a particular implementation, group addressed traffic may be validated based on the active group integrity key included in the active key set.

In some implementation, the first device may receive an association request from a particular device of the data link group after a group key update window has expired. In a particular implementation, the first device may transmit an association response to the particular device in response to receiving the association request. The association response may enable the particular device to associate with the first device. For example, the first device 104 may receive the association request 175 from the fourth device 110 and may transmit the association response 176 to the fourth device 110 in response to receiving the association request 175. In another implementation, the first device may transmit an association rejection to the particular device in response to determining a criterion is not met. For example, if a criterion is not met, the first device 104 may transmit the association rejection 178 to the fourth device 110.

In some implementations, the first device may receive a second announcement message from a second device of the data link group. The second announcement message may indicate generation of a candidate group key.

In some implementations the first device may obtain the candidate group key by randomly generating the candidate group key. In a particular implementation, the group candidate key includes 256 randomly generated bits. In some implementations, the candidate group key may be generated in response to expiration of a countdown from a random value.

In some implementations, the announcement message may include a key indicator, a data link group identifier of the data link group, a device identifier of a particular device that generated the candidate group key, or a combination thereof. For example, the announcement message 160 may include the key indicator 168, the group ID 164, and the device ID 166. In a particular implementation, the key indicator 168 may include a timestamp, a hash value, or both.

In some implementations, the key indicator may include a MAC address of the first device, a hash value, a timestamp corresponding to generation of the candidate group key, or a combination thereof. The hash value may be generated based on the MAC address, the candidate group key, or both. For example, a key indicator of the announcement message 170 may include the MAC address of the second device 106.

The device identifier may include a second MAC address of the first device 104 that generated the second group key 142.

In some implementations, the first device may receive a second announcement message from a second device of the data link group. The second announcement message may include a second group key and a second timestamp. The first device may transmit the candidate group key to the second device based on determining a first timestamp included in the announcement message is earlier than the second timestamp. In a particular implementation, the first device 104 may receive the second announcement message from a particular device of the data link group after transmission of the announcement message 160.

In some implementations, the first device operates as a key generator device of the data link group and other devices of the data link group do not operate as key generator devices while the first device is designated to operate as the key generator device. Prior to the first device ceasing operation as the key generator device, the method 900 may include transmitting a message from the first device to the second device of the data link group, the message indicating the second device is to operate as the key generator device of the data link group. For example, the first device 104 may transmit a message to the second device 106 indicating that the second device is to operate as the key generator device of the data link group, as described with reference to FIG. 1. The method 900 may also include terminating key generation operations at the first device. The method 900 may further include disassociating from the data link group by the first device, transitioning into a low power operating mode at the first device, or both. For example, the first device 104 may terminate the key generation operations and transition into a low power operating mode, as described with reference to FIG. 1.

In some implementations, the first device may transmit a message from the first device to a second device of the data link group. The message may indicate the second device is to operate as a key generator device of the data link group. The first device may disassociate from the data link group after sending the message. In response to receiving the message, the second device may operate as the key generator device of the data link group.

In other implementations, the first device may receive a second announcement message during a second discovery window, the second announcement message may indicate a second device of the data link group has generated a second group key.

In some implementations, the first device may update a counter. The counter may be related to an expiration of the candidate group key. The first device may generate a new group key in response to the counter reaching a particular value. The first device may halt updating the counter in response to receiving the second announcement message prior to the counter reaching the particular value.

In some implementations, the first device may be configured to associate with no more than a threshold number of devices. In other implementations, the first device associates with other devices on an as-needed basis.

In some implementations, the first device may dissociate from a third device of the data link group in response to receiving an association request from a fourth device of the data link group. In a particular implementation, the first device may determine to disassociate from the third device because the first device is not buffering data to be transported to the third device prior to an end of a second paging window. In another particular implementation, the first device may be in an associated state with a second device of the data link group prior to receiving the association request from the fourth device and the second device may be in an associated state with the third device. The fourth device may not be in an associated state with the devices of the data link group. In this particular implementation, the first device may determine to disassociate from the third device based on the third device being in an associated state with the second device.

Figure 10:
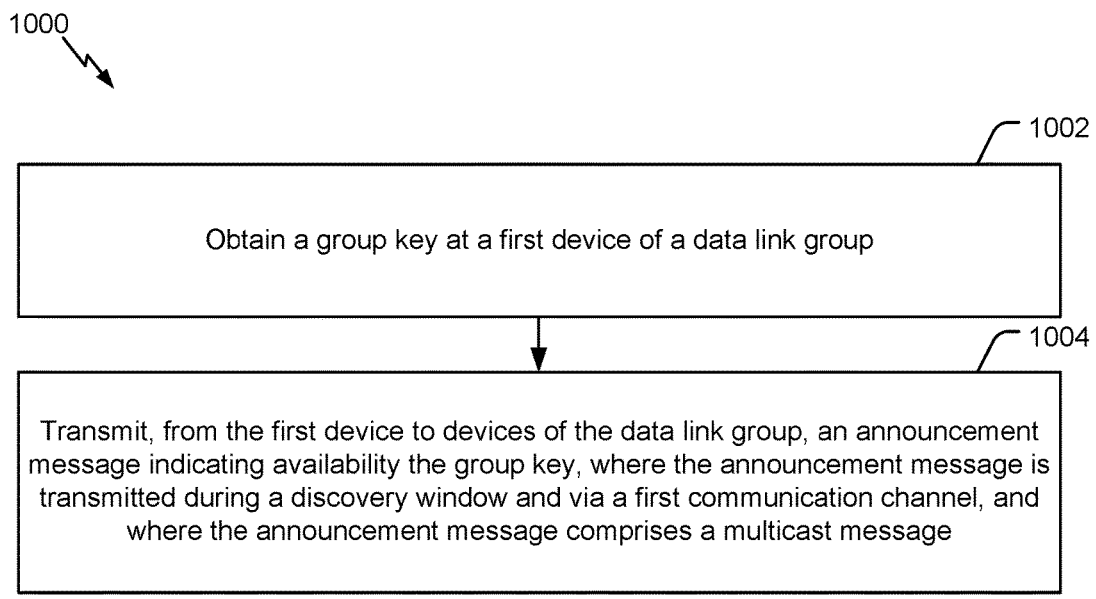
FIG. 10 is a flow diagram of a fourth illustrative method of operation at a device of a data link group.

Referring to FIG. 10, a fourth implementation of a method 1000 of operation at a device of a wireless network is shown. The wireless network may include multiple data link groups. The method 1000 may be performed at any of the devices 104-110, the device 202 of FIG. 2, any of the devices described with reference to FIG. 3, or either of the devices 402, 404 of FIG. 4.

The method 1000 includes obtaining a candidate group key at a first device of a data link group, at 1002. For example, the candidate group key may include or correspond to the second group key 142 of FIG. 1, the group key 214 of FIG. 2, or any of the keys described with reference to FIGS. 3-5. With reference to FIG. 1, the first device 104 may obtain the second group key 142. In some implementations, the first device obtains the candidate group key by generating the candidate group key at the first device. In other implementations, the first device obtains the candidate group key by receiving the candidate group key at the first device from another device of the data link group. The candidate group key may enable at least one of encryption or decryption of group addressed data messages corresponding to the data link group.

The method 1000 includes transmitting, from the first device to devices of the data link group, an announcement message indicating availability the candidate group key, where the announcement message is transmitted during a discovery window and via a first communication channel, and where the announcement message includes a multicast message, at 1004. For example, the announcement message 160 may include or correspond to the announcement message 160, the announcement message 170 of FIG. 1, or the announcement message 510 of FIG. 5. In some implementations, the announcement message may be transmitted during a discovery window and via a NAN communication channel, and the announcement message may be a multicast message.

In some implementations, the first communication channel corresponds to a neighbor aware network (NAN) communication channel, such as the NAN communication channel 302 of FIG. 3, and a group key update window includes a duration between an end of the discovery window and a beginning of a second discovery window. The group key update window, such as the duration between the first discovery window 310 and the second discovery window 312 of FIG. 3, may include multiple transmission windows. A first transmission window of the multiple transmission windows may have a first offset from the end of the discovery window and a second transmission window of the multiple transmission windows has a second offset from the end of the discovery window, as described with reference to FIGS. 1 and 3.

In some implementations, the method 1000 may include transmitting, from the first device to a second device of the NAN during a paging window, a paging message indicating the first device has data corresponding to the first group key to transmit to the second device. The paging window may be part of a group transmission window. To illustrate, the paging window may be one of the paging windows 332, 342, 352, 362 of FIG. 3.

In some implementations, the method 1000 may include receiving a trigger message from the second device and transmitting the candidate group key in response to receiving a trigger message. For example, the trigger message may include or correspond to the trigger message 167 of FIG. 1, the request of 338 of FIG. 3, or the request 348 of FIG. 3. The candidate group key may be encrypted based on a pairwise key, and the pairwise key may be generated during an association process between the first device and the second devices. For example, the pairwise key may include or correspond to the pairwise key 146 of FIG. 1. An acknowledgement message may be received by the first device. The acknowledgement message may indicate that the second device received the candidate group key.

In some implementations, an active key set may include an active group key, an active distribution key, and an active group integrity key. For example, the active key set 130 may include the first group key 132, the first distribution key 134, and the first group integrity key 131 of FIG. 1. In some implementations, a candidate key set may include a candidate group key, a candidate distribution key, and a candidate group integrity key. For example, the candidate key set 140 may include the second group key 142, the second distribution key 134, and the second group integrity key 141 of FIG. 1.

In some implementations, the candidate group key may be encoded based on the active group key, the active distribution key (of the active key set), or the pairwise key. For example, the second group key 142 may be encrypted based on the first group key 132, the first distribution key 134, or the pairwise key 146. The key delivery message 180 (including the encrypted second group key 142) may be encrypted based on the first group key 132, the first distribution key 134, or the pairwise key 146. The method 1000 may include transmitting the encoded candidate group key. The encoded candidate group key may be decoded based on the active group key, the active distribution key (of the active key set), or the pairwise key. For example, the second key 142 may be decrypted based on the first group key 132, the first distribution key 134, or the pairwise key 146. In a particular implementation, group addressed traffic may be validated based on the active group integrity key included in the active key set, such as the first group integrity key 131 of FIG. 1.

In other implementations, the candidate group key may be transmitted in response to receiving an association request. For example, the key delivery message 180 (including the second group key 142) may be transmitted from the first device 104 to the fourth device 110 in response to receiving the association request 175. The method 1000 may also include receiving an association request from a particular device of the NAN after a group key update window has expired. The group key update window may include a particular time interval corresponding to performance of key update operations in the data link group. For example, the group key update window may correspond to generation, transmission, reception, or a combination thereof, of announcement messages, key delivery messages, or both, in the data link group. In another implementation, the method 1000 includes transmitting an association response to the particular device in response to receiving the association request, where the association response enables the particular device to associate with the first device. For example, with reference to FIG. 1, the first device 104 may receive the association request 175 from the fourth device 110 responsive to transmitting the announcement message 160. The first device 104 may transmit the association response 176 to the fourth device 110 in response to receiving the association request 175.

In some implementations, the method 1000 may include receiving an association request from a particular device of the data link group after a group key update window has expired. For example, the association request may include or correspond to the association request 175 of FIG. 1. The group key update window, such as the duration between the first discovery window 310 and the second discovery window 312 of FIG. 3, may include a particular time interval corresponding to performance of group key update operations in the data link group. The method 1000 may also include transmitting an association rejection to the particular device in response to determining a first criterion is satisfied. For example, the association rejection may include or correspond to the association rejection 178 of FIG. 1. The first criterion may be satisfied when a number of devices associated with the first device is greater than or equal to a threshold.

In some implementations, the method 1000 may include receiving, from a particular device of the data link group, an association request responsive to transmitting the announcement message. For example, the first device 104 may receive the association request 175 from the fourth device 110 responsive to the first device 104 transmitting the announcement message 160, as described with reference to FIG. 1. The method 1000 may also include transmitting an association response to the particular device in response to determining a second criterion is satisfied. For example, the association response may include or correspond to the association response 176 of FIG. 1. The second criterion may be satisfied when a number of devices associated with the first device is less than or equal to a threshold. For example, the first device 104 may transmit the association response 176 in response to determining that the first device 104 is associated with a number of devices that is less than a threshold.

The method 1000 may include transmitting data to the devices of the data link group. To illustrate, the first device may transmit data to the devices of the data link group, where the data is encrypted based on the candidate group key after the candidate group key is set as the active group key. For example, with reference to FIG. 1, the first device 104 may transmit data to the second device 106, and the data may be encrypted based on the second group key 142 after the second group key 142 is set as the active group key.

The method 1000 may include generating a second candidate group key prior to expiration of the active group key. For example, the first device 104 may generate the second group key 142 prior to expiration of the first group key 132.

In some implementations, the method 1000 may include setting the candidate group key as an active group key. For example, the first device 104 may, after expiration of the first group key 132 as an active group key, set the second group key 142 as the active group key, as described with reference to FIG. 1. The method 1000 may also include transmitting data, such as data encrypted based on the active group key, to devices of the data link group. To illustrate, the first device 104 may provide one or more services and transmit group addressed traffic to the devices of the wireless network 102 as described with reference to FIG. 1. The method 1000 may also include generating a second candidate group key prior to expiration of the active group key. The method 1000 may also include transmitting a second announcement message during multiple discovery windows of the data link group.

The second announcement message may indicate availability of the second candidate group key.

The method 1000 may include distributing the second candidate group key to the devices of the data link group during a paging window designated for the data link group. The method 1000 may also include determining each device associated with the first device has received the second candidate group key based on receiving a corresponding acknowledgement message from each device associated with the first device. For example, the acknowledgement message may include or correspond to the ACK of FIG. 1. The method 1000 may further include ceasing transmission of the second announcement message in response to determining each device associated with the first device has received the second candidate group key. The first device 104 may stop transmitting the announcement message 170 in response to determining that the first device 104 has received a MAC ACK from each device that is associated with the first device 104, as described with reference to FIG. 1

In some implementations, the candidate group key is related to a first key indicator, such as the key indicator 168 of FIG. 1. For example, the key indicator 168 may provide information related to the second group key 142 and the key indicator 168 may include a hash value generated based on the second group key 142 or a timestamp corresponding to generation of the second group key 142. The method 1000 may include receiving a second announcement message that includes a second candidate group key and a second key indicator from a second device of the data link group. The method 1000 may further include selecting the candidate group key for propagation based on a comparison of the key indicator to the second key indicator.

In some implementations, the first device determines to operate as a key generator device based on the first device being an originator of the data link group, based on the first device being associated with more devices than each device of other devices of the data link group, based on the first device having spent more time in the data link group than each device of the other devices of the data link group, based on a number of devices associated with the first device, based on a topology of the data link group, based on a duration of time the first device has been included in the data link group, based on a rank of the first device within the data link group, based on a battery level of the first device, or a combination thereof. For example, the first device 104 may determine to operate as the key generator device based on one or more criterion, as described with reference to FIG. 1.

Figure 11:
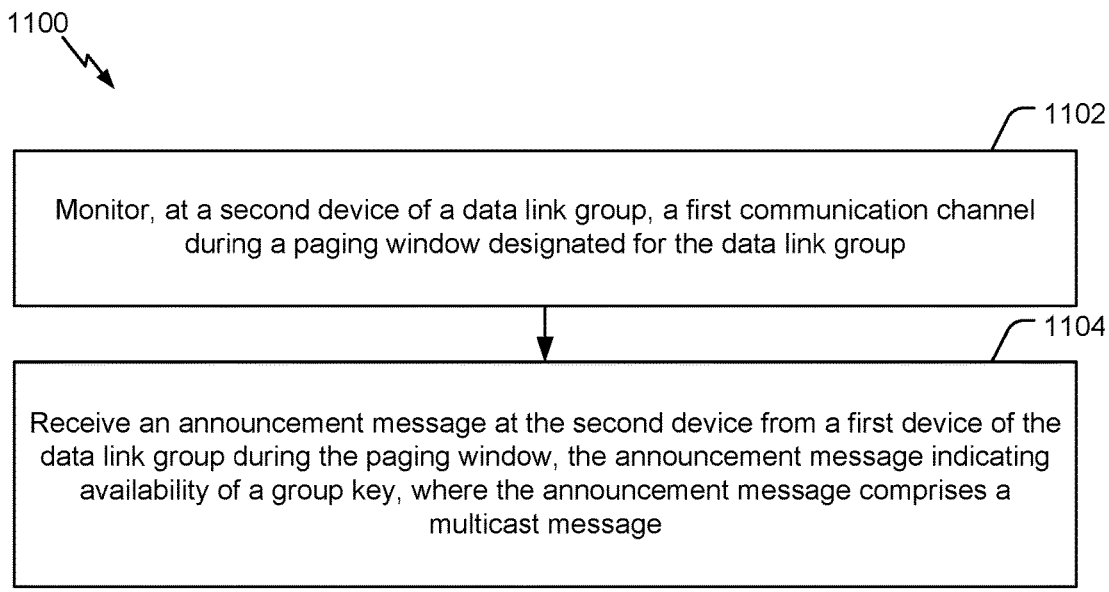
FIG. 11 is a flow diagram of a fifth illustrative method of operation at a device of a data link group.

Referring to FIG. 11, a fifth implementation of a method 1100 of operation at a device of a wireless network is shown. The wireless network may include multiple data link groups. The method 1100 may be performed at any of the devices 104-110, the device 202 of FIG. 2, any of the devices described with reference to FIG. 3, or either of the devices 402, 404 of FIG. 4.

The method 1100 includes monitoring, at a second device of a data link group, a first communication channel during a paging window designated for the data link group, at 1102. For example, the first communication channel may include or correspond to the NAN communication channel 302 or the data link group channel 304 of FIG. 3. The paging window may include or correspond to one of the paging windows 332, 342, 352, 362 of FIG. 3.

The method 1100 includes receiving an announcement message at the second device from a first device of the data link group during the paging window, the announcement message indicating availability of the candidate group key, where the announcement message includes a multicast message, at 1104. For example, the announcement message may include or correspond to the announcement message 160 or the announcement message 170 of FIG. 1. The paging window may be part of a group transmission window, such as the group transmission windows 320, 322, 324, 326 of FIG. 3.

In some implementations, the second device may obtain the candidate group key. The second device may obtain the candidate group key by transmitting a trigger message to the first device in response to receiving the announcement message during the paging window and by receiving the candidate group key from the first device during a data window. Referring to FIG. 1, the trigger message may include or correspond to the trigger message 167 of FIG. 1.

In other implementations, the second device may transmit a trigger message to the first device in response to receiving the announcement message. For example, referring to FIG. 1, the second device 106 may transmit a trigger message 167 to the first device 104 in response to receiving the announcement message 160. The announcement message may include a key indicator, such as the key indicator 168 of FIG. 1. The key indicator may include a timestamp, a hash value, or both.

In some implementations, the second device may receive a second announcement message from a third device of the data link group during the paging window. The second announcement message may include a second timestamp and may indicate generation of a second group key. The second device may transmit a trigger message to the first device based on a first timestamp of the announcement message being earlier than the second timestamp. The second device may receive the candidate group key from the first device in response to transmitting the trigger message.

In other implementations, the second device may generate a second group key in response to determining the first device disassociated from the data link group. For example, referring to FIG. 1, the second device 106 may generate a group key in response to determining the first device 104 disassociated from the data link group.

In some implementations, the method 1100 may include updating a counter, the counter related to an expiration of a prior group key. For example, the counter may include or correspond to the counter 204 of FIG. 2. The method 1100 may also include halting updating the counter in response to receiving the announcement message prior to the counter reaching a particular value related to generation of a new group key by the second device.

In some implementations, the method 1100 may include identifying a first key indicator included in the announcement message. For example, the second device 106 may identify the key indicator 168 in the announcement message 160, as described with reference to FIG. 1. The method 1100 may also include receiving a second announcement message from a third device of the data link group during the paging window. The second announcement message may include a second key indicator and may indicate generation of a second candidate group key. The method 1100 may include transmitting a trigger message to the first device based on the first key indicator of the announcement message having higher priority than the second key indicator. For example, the second device 106 may send the trigger message 167 to the first device 104 based on the key indicator 168 of the announcement message 160. The method 1100 may further include receiving the candidate group key from the first device in response to transmitting the trigger message.

In some implementations, the method 1100 may include, prior to receiving the announcement message, initiating generation of a second candidate group key. For example, the second device 106 may generate a candidate group key prior to receiving the announcement message 160 from the first device 104, as described with reference to FIG. 1. The method 1100 may also include, in response to receiving the announcement message, stopping generation of the second candidate group key. For example, the second device 106 may stop generation of the candidate group key or suppress the candidate group key in response to receiving an announcement message, such as the announcement message 160 from the first device 104.

In some implementations, the method 1100 may include in response to receiving the announcement message, retransmitting the announcement message to devices of the data link group. For example, the second device 106 may transmit the announcement message 170 to the third device 108 and the fourth device 110 in response to receiving the announcement message 160 from the first device 104.

In some implementations, the method 1100 may include, in response to receiving the announcement message, determining whether the second device is associated with the first device. The method 1100 may also include, in response to a determination that the first device 104 is associated with the second device 106, requesting the candidate group key from the first device 104. For example, the second device 106 may determine that the second device 106 is associated with the first device 104, as described with reference to FIG. 1.

In some implementations, the method 1100 may include, in response to receiving the announcement message, determining whether the second device is associated with the first device. The method 1100 may also include, in response to a determination that the second device is unassociated with the first device, identifying a third device of the data link group that has received the candidate group key and that is associated with the second device. For example, the fourth device 110 may determine that the fourth device 110 is not associated with the first device 104, as described with reference to FIG. 1. The fourth device 110 may identify the second device 106 as having the second group key 142 based the paging message 165 or the announcement message 170. The third device may be identified during a time period that ends prior to expiration of an active group key of the data link group. The time period may begin after the announcement message is received and end at a predetermined time before the expiration of the active group key. The method 1100 may include requesting the candidate group key from the third device. The method 1100 may further include receiving the candidate group key from the third device prior to the expiration of the active group key. For example, the fourth device 110 may request the second group key 142 by transmitting the trigger message 167 and may receive the key delivery message 180 including the second group key 142.

In some implementations, the method 1100 may include performing a security association with the third device in response to a determination that the second device is unassociated with the first device. In a particular implementation, the security association establishes a pairwise key, such as the pairwise key 146 of FIG. 1.

The method 1100 may also include receiving an encoded candidate group key from the third device. The method 1100 may include decoding the encoded candidate group key based on the pairwise key to generate the candidate group key at second device. For example, the pairwise key may include or correspond to the pairwise key 146 of FIG. 1. The method 1100 may further include storing the candidate group key at a memory. For example, the memory may include or correspond to the key storage 208 of FIG. 2.

In some implementations, the method 1100 may include, in response to a determination that the second device is unassociated with the first device, identifying a predetermined time before expiration of an active group key of the data link group. The method 1100 may also include prior to the predetermined time, sending a multicast request for the candidate group key to at least one device of the data link group. The method 1100 may further include receiving the candidate group key from a third device of the data link group responsive to the multicast request.

Figure 12:
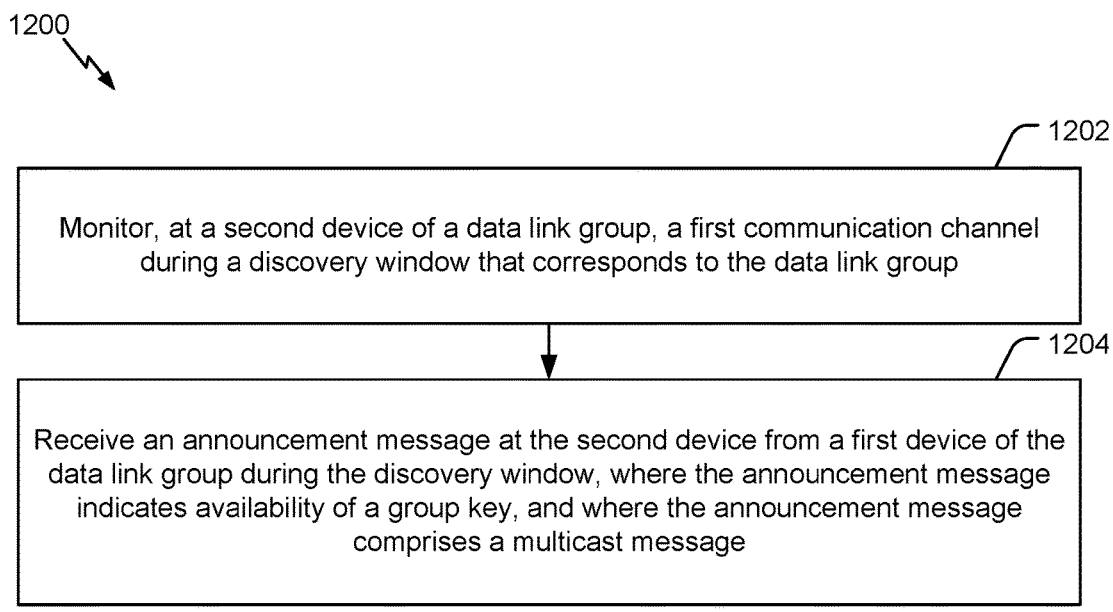
FIG. 12 is a flow diagram of a sixth illustrative method of operation at a device of a data link group.

Referring to FIG. 12, a sixth implementation of a method 1200 of operation at a device of a wireless network is shown. The wireless network may include multiple data link groups. The method 1200 may be performed at any of the devices 104-110 of FIG. 1, the device 202 of FIG. 2, any of the devices described with reference to FIG. 3, or either of the devices 402, 404 of FIG. 4.

The method 1200 includes monitoring, at a second device of a data link group, a first communication channel during a discovery window that corresponds to the data link group, at 1202. For example, the first communication channel may include or correspond to the NAN communication channel 302 or the data link group channel 304 of FIG. 3. The discovery window may include or correspond to the first discovery window 310 and the second discovery window 312 of FIG. 3. Referring to FIG. 1, a second device 106 of a data link group of the wireless network 102 (e.g., the NAN) may monitor a wireless channel corresponding to the data link group during a discovery window of the data link group.

The method 1200 includes receiving an announcement message at the second device from a first device of the data link group during the discovery window, where the announcement message indicates availability of a candidate group key, and where the announcement message includes a multicast message, at 1204. For example, the announcement message may include or correspond to the announcement message 160, the announcement message 170 of FIG. 1, or the announcement message 510 of FIG. 5.

In a particular implementation, the second device may transmit an association request to the first device in response to an expiration of a countdown, such as a countdown based on the counter 204 of FIG. 2. For example, the fourth device 110 may transmit an association request 175 to the first device 104.

In some implementations, the second device may transmit a trigger message to the first device in response to receiving a paging message from the first device during a paging window of a data link group. The second device may receive the candidate group key from the first device at the second device in response to the trigger message. For example, the second device 106 may transmit a trigger message 167 to the first device 104 in response to receiving a paging message 165 from the first device, as described with reference to FIG. 1. The second device 106 may receive the second group key 142 from the first device 104.

In other implementations, the second device may transmit an association request to the first device in response to receiving the announcement message. For example, referring to FIG. 1, when the second device 106 is unassociated with the first device 104 may transmit an association request 175 to the first device 104 in response to receiving the announcement message 160.

In a particular implementation, the second device may associate with the first device in response to receiving an association response from the first device. The association response, such as the association response 176 of FIG. 1, may indicate the first device is available to associate. The second device may receive the candidate group key from the first device at the second device. The second device may transmit a second association request to the first device in response to receiving an association rejection, such as the association rejection 178 of FIG. 1, from the first device.

In some implementations, the announcement message may be received via a first communication channel. For example, the first communication channel may include the NAN communication channel 302 of FIG. 3. The method 1200 may also include transmitting, via a second communication channel, a trigger message to the first device in response to receiving a paging message from the first device during a paging window of the second communication channel. For example, the second communication channel may include the data link group channel 304 of FIG. 3. The paging message may include or correspond to the paging message 165 or the paging message 190 of FIG. 1. The method 1200 may further include receiving the candidate group key from the first device at the second device and validating the candidate group key based on an integrity group key.

In some implementations, the method 1200 may include, after receiving the announcement message, starting a countdown. The method 1200 may also include determining, by the second device, that the second device has not received the candidate group key in response to an expiration of the countdown. The method 1200 may further include transmitting an association request to the first device in response to determining that the second device has not received the candidate group key by the expiration of the countdown. For example, the fourth device 110 may determine that it has not received the second group key 142 and may transmit the association request 175 to the first device 104, as described with reference to FIG. 1.

In some implementations, the method 1200 may include, prior to receiving the announcement message including a first key indicator, generating a second candidate group key and a second key indicator of the second candidate group key at the second device. For example, the first device 104 may generate the second group key 142 and the key indicator 168 prior to receiving an announcement message from another device of the wireless network 102, as described with reference to FIG. 1. The method 1200 may also include selecting the second candidate group key for propagation based on the second key indicator indicating a higher priority than a first key indicator. For example, the first device may select the second group key 142 for propagation based on the key indicator 168 that is included in the announcement message 160, as described with reference to FIG. 1. The method 1200 may further include after receiving the announcement message, transmitting a paging message to a fourth device of the data link group during a paging window via a second communication channel, the fourth device associated with the second device. The paging message may indicate the second candidate group key is available from the second device. For example, the first device 104 may transmit the paging message 165 to the fourth device 110, as described with reference to FIG. 1.

In some implementations, the method 1200 may include determining that the second key indicator has the higher priority than the first key indicator based on one or more conditions. The one or more conditions may include when the second key indicator indicates a higher priority medium access control (MAC) address, when the second key indicator indicates an earlier timestamp, or when the second key indicator indicates a higher priority hash value. For example, the second device 106 may determine that a second key indicator (corresponding to a candidate group key generated by the second device 106) has a higher priority than the key indicator 168 included in the announcement message 160 based on MAC addresses, timestamps, or hash values, as described with reference to FIG. 1.

The method 700 of FIG. 7, the method 800 of FIG. 8, the method 900 of FIG. 9, the method 1000 of FIG. 10, the method 1100 of FIG. 11, the method 1200 of FIG. 12, or a combination thereof, enable the distribution of a group key to the devices of the data link group. The candidate group key may be distributed with a reduction in key-related traffic and overhead within a NAN or mesh network that includes the data link group. For example, key-related traffic may be reduced by sending an announcement message, such as a group key announcement message, during a paging window or a discovery window when devices of the data link group are awake. As another example, an active distribution key may be used to encrypt a candidate group key (e.g., a potential "next" active group key) and the encrypted candidate group key may be sent as a multicast message to one or more devices of the data link group. By sending the candidate group key as a multicast message, the candidate group key may be distributed to the one or more devices of the data link group without performing a security association, P2P communications, or a combination thereof, between two devices of the data link group.

The process shown in the method 700 of FIG. 7, the method 800 of FIG. 8, the method 900 of FIG. 9, the method 1000 of FIG. 10, the method 1100 of FIG. 11, the method 1200 of FIG. 12, or a combination thereof, may be controlled by a processing unit such as a central processing unit (CPU), a controller, a field-programmable gate array (FPGA) device, an application-specific integrated circuit (ASIC), another hardware device, firmware device, or any combination thereof. As an example, the method 700 of FIG. 7, the method 800 of FIG. 8, the method 900 of FIG. 9, the method 1000 of FIG. 10, the method 1100 of FIG. 11, the method 1200 of FIG. 12, or a combination thereof, can be performed by one or more processors that execute instructions to transmit an announcement message, to distribute a group key, or a combination thereof. Additionally, a first portion of one of the methods of FIGS. 7-12 may be combined with at least a second portion of another one of the methods of FIGS. 7-12. For example, a first portion of the method 700 of FIG. 7 may be combined with a second portion of one of the method 800 of FIG. 8, the method 900 of FIG. 9, the method 1000 of FIG. 10, the method 1100 of FIG. 11, the method 1200 of FIG. 12, or a combination thereof.

Figure 13:
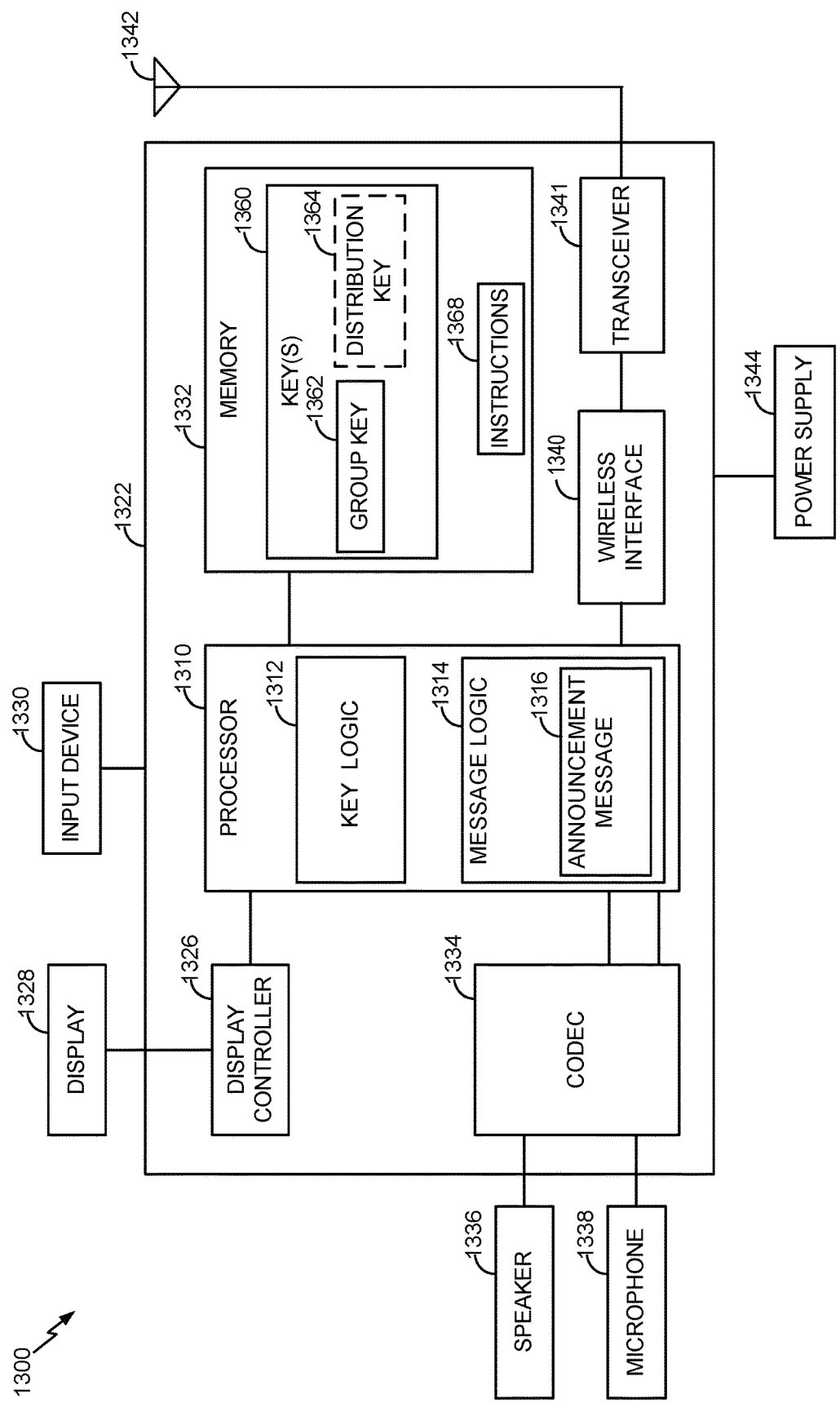
FIG. 13 is a diagram of a wireless device that is operable to support various implementations of one or more methods, systems, apparatuses, and computer-readable media disclosed herein.

Referring to FIG. 13, a particular illustrative implementation of a wireless communication device is depicted and generally designated 1300. The device 1300 includes a processor 1310, such as a digital signal processor, coupled to a memory 1332. The device 1300, or components thereof, may correspond to the devices 104-110 of FIG. 1, the device 202 of FIG. 2, the devices described with reference to FIG. 3, the devices 402, 404 of FIG. 4, or components thereof.

Memory 1332, such as a non-transitory computer readable medium, may include one or more keys 1360 and instructions 1368. The instructions may be executable by the processor 1310. For example, the memory 1332 may include or correspond to the key storage 208 of FIG. 2. The one or more keys 1360 may include a group key 1362 of a data link group that includes the device 1300. For example, the group key 1362 may include or correspond to the first group key 132, the second group key 142 of FIG. 1, or the group key 214 of FIG. 2. Optionally, the one or more keys 1360 may include a distribution key 1364 of the data link group. For example, the distribution key 1364 may include or correspond to the first distribution key 134 or the second distribution key 144 of FIG. 1. In some implementations, the one or more keys 1360 may include multiple group keys, such as an active group key and a candidate group key. Additionally, the one or more keys 1360 may include multiple distribution keys, such as an active distribution key and a candidate distribution key.

The processor 1310 may include key logic 1312 and message logic 1314. The key logic 1312 may include or correspond to the key logic 112 of FIG. 1, the counter 204, the key generator 206 of FIG. 2, or a combination thereof. The message logic 1314 may include or correspond to the message logic 114 of FIG. 1. The message logic 1314 may be configured to generate an announcement message 1316, such as the announcement message 160 or the announcement message 170 of FIG. 1. The announcement message 1316 may correspond to (e.g., include) the group key 1362.

The processor 1310 may be configured to execute software (e.g., a program of one or more instructions 1368) stored in the memory 1332. For example, the processor 1310 may be configured to operate in accordance with the method 700 of FIG. 7, the method 800 of FIG. 8, the method 900 of FIG. 9, the method 1000 of FIG. 10, the method 1100 of FIG. 11, the method 1200 of FIG. 12, or a combination thereof. To illustrate, the processor 1310 may be configured to execute the instructions 1368 that cause the processor 1310 to identify an obtained group key 1362 of a data link group and to initiate transmission of the announcement message 1316 to one or more devices of the data link group during a paging window. The announcement message 1316 may correspond to the group key 1362 and may be transmitted as a multicast message that indicates the announcement message 1316 is a group key announcement message.

As another example, the processor 1310 may be configured to execute the instructions 1368 that cause the processor 1310 to generate the group key 1362 and the distribution key 1364 corresponding to the data link group and to encode the group key 1362 and the distribution key 1364 using a second distribution key (not shown), such as an active distribution key. The second distribution key may correspond to an active group key of the data link group. The instructions 1368 may further cause the processor to initiate transmission of the encrypted group key and the encrypted distribution key to one or more devices of the data link group.

FIG. 13 also shows a display controller 1326 that is coupled to the processor 1310 and to a display 1328. A coder/decoder (CODEC) 1334 can also be coupled to the processor 1310. A speaker 1336 and a microphone 1338 can be coupled to the CODEC 1334. FIG. 13 also indicates that a wireless interface 1340 can be coupled to the processor 1310 and to an antenna 1342. For example, the wireless interface 1340 may be coupled to the antenna 1342 via a transceiver 1341. The transceiver 1341 may include a transmitter, a receiver, or both. The transceiver 1341 may be configured to transmit one or more messages generated by the message logic 1314 and to receive one or more messages transmitted to the device 1300 by other devices, such as devices of the data link group.

In some implementations, the processor 1310, the display controller 1326, the memory 1332, the CODEC 1334, the wireless interface 1340, and the transceiver 1341 are included in a system-in-package or system-on-chip device 1322. In a particular implementation, an input device 1330 and a power supply 1344 are coupled to the system-on-chip device 1322. Moreover, in another particular implementation, as illustrated in FIG. 13, the display 1328, the input device 1330, the speaker 1336, the microphone 138, the antenna 1342, and the power supply 1344 are external to the system-on-chip device 1322. However, each of the display 1328, the input device 1330, the speaker 1336, the microphone 1338, the antenna 1342, and the power supply 1344 can be coupled to a component of the system-on-chip device 1322, such as an interface or a controller.

In conjunction with one or more of the described implementations of FIGS. 1-13, a first apparatus includes means for obtaining a group key at a first device of a data link group. For example, the means for obtaining the group key may include or correspond to the key logic 112 of FIG. 1, the key generator 206, the receiver 210 of FIG. 2, the key logic 1312, the wireless interface 1340, the transceiver 1341, the processor 1310 programmed to execute the instructions 1368 of FIG. 13, one or more other structures, devices, circuits, modules, or instructions to obtain the group key, or any combination thereof. The group key may include or correspond to the first group key 132 of FIG. 1, the second group key 142 of FIG. 1, the group key 214 of FIG. 2, or any of the group keys described with reference to FIGS. 3-5.

The first apparatus also includes means for transmitting an announcement message corresponding to the group key to one or more devices of the data link group during a paging window. The announcement message may correspond to the group key and may be transmitted as a multicast message that indicates the announcement message is a group key announcement message. For example, the means for transmitting the announcement message may include or correspond to the message logic 114 of FIG. 1, the transmitter 212 of FIG. 2, the wireless interface 1340, the transceiver 1341, the antenna 1342 the processor 1310 programmed to execute the instructions 1368 of FIG. 13, one or more other structures, devices, circuits, modules, or instructions to transmit the announcement message, or any combination thereof.

In conjunction with the one or more described implementations, a second apparatus includes means for generating a group key and a distribution key corresponding to a data link group. For example, the means for generating may include or correspond to the key logic 112 of FIG. 1, the key generator 206 of FIG. 2, the key logic 1312, the processor 1310 programmed to execute the instructions 1368 of FIG. 13, one or more other structures, devices, circuits, modules, or instructions to generate the group key and the distribution key, or any combination thereof.

The second apparatus includes means for encoding the group key and the distribution key using a second distribution key. The second distribution key may correspond to an active group key of the data link group. For example, the means for encoding may include or correspond to message logic 114, the encoder/decoder 118 of FIG. 1, the message logic 1314, the processor 1310 programmed to execute the instructions 1368 of FIG. 13, one or more other structures, devices, circuits, modules, or instructions to encode the group key and the distribution key, or any combination thereof.

The second apparatus also includes means for transmitting the encoded group key and the encoded distribution key to one or more devices of the data link group. For example, the means for transmitting may include or correspond to the message logic 114 of FIG. 1, the wireless interface 1340, the transmitter 212 of FIG. 2, the transceiver 1341, the antenna 1342, the processor 1310 programmed to execute the instructions 1368 of FIG. 13, one or more other structures, devices, circuits, modules, or instructions to transmit the encoded group key and the encoded distribution key, or any combination thereof.

In conjunction with the one or more described implementations, a third apparatus includes means for obtaining a group key at a first device of a data link group. For example, the means for obtaining may include or correspond to the key logic 112 of FIG. 1, the key logic 1312, the processor 1310 programmed to execute the instructions 1368 of FIG. 13, one or more other structures, devices, circuits, modules, or instructions to obtain the group key, or any combination thereof.

The third apparatus includes means for transmitting, from the first device to devices of the data link group, an announcement message corresponding to the group key. For example, the means for encoding may include or correspond to the message logic 114, the first device 104 of FIG. 1, the message logic 1314, the wireless interface 1340, the transceiver 1341, the antenna 1342, the processor 1310 programmed to execute the instructions 1368 of FIG. 13, one or more other structures, devices, circuits, modules, or instructions to transmit the announcement message, or any combination thereof. The announcement message may include a multicast message and may be transmitted during a paging window via a communication channel, such as a NAN communication channel or via a data link group channel.

In conjunction with the one or more described implementations, a fourth apparatus includes means for monitoring, at a second device of a data link group, a first wireless channel during a discovery window. For example, the means for monitoring may include or correspond to the message logic 114, the first device 104 of FIG. 1, the message logic 1314, the wireless interface 1340, the transceiver 1341, the antenna 1342, the processor 1310 programmed to execute the instructions 1368 of FIG. 13, one or more other structures, devices, circuits, modules, or instructions to monitor the wireless channel, or any combination thereof. The first wireless channel may include or correspond to the NAN communication channel 302 or the data link group channel 304 of FIG. 3.

The fourth apparatus includes means for receiving an announcement message at the second device from a first device of the data link group during the discovery window. For example, the means for receiving may include or correspond to the message logic 114, the first device 104 of FIG. 1, the message logic 1314, the wireless interface 1340, the transceiver 1341, the antenna 1342, the processor 1310 programmed to execute the instructions 1368 of FIG. 13, one or more other structures, devices, circuits, modules, or instructions to receive an announcement message, or any combination thereof.

In conjunction with the one or more described implementations, a fifth apparatus includes means for monitoring, at a second device of a data link group of a NAN, a wireless channel corresponding to the data link group during a paging window of the data link group. For example, the means for monitoring may include or correspond to the message logic 114 of FIG. 1, the message logic 1314, the wireless interface 1340, the transceiver 1341, the antenna 1342, the processor 1310 programmed to execute the instructions 1368 of FIG. 13, one or more other structures, devices, circuits, modules, or instructions to monitor the wireless channel, or any combination thereof.

The fifth apparatus includes means for receiving an announcement message at the second device from a first device of the data link group during the paging window, the announcement message indicating generation of a group key. For example, the means for receiving may include or correspond to the message logic 114, the first device 104 of FIG. 1, the message logic 1314, the wireless interface 1340, the transceiver 1341, the antenna 1342, the processor 1310 programmed to execute the instructions 1368 of FIG. 13, one or more other structures, devices, circuits, modules, or instructions to receive the announcement message, or any combination thereof. The announcement message may include a multicast message.

One or more of the disclosed implementations may be implemented in a system, a device, or an apparatus, such as the device 1300, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 1300 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle or a device integrated within a vehicle, any other device that includes a processor or that stores or retrieves data or computer instructions, or a combination thereof. As another illustrative, non-limiting example, the system, the device, or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Although one or more of FIGS. 1-13 may illustrate systems, apparatuses, methods, or a combination thereof, according to the teachings of the disclosure, the disclosure is not limited to these illustrated systems, apparatuses, methods, or a combination thereof. One or more functions or components of any of FIGS. 1-13 as illustrated or described herein may be combined with one or more other portions of another function or component of FIGS. 1-13. Accordingly, no single implementation described herein should be construed as limiting and implementations of the disclosure may be suitably combined without departing from the teachings of the disclosure.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device for wireless communication, the device comprising:
    a processor including key logic configured to obtain a candidate group key corresponding to a data link group; and
    wireless interface circuitry configured to transmit an announcement message to one or more devices of the data link group during a paging window designated for the data link group, wherein the announcement message indicates availability of the candidate group key, wherein the announcement message comprises a multicast message, wherein the paging window is part of a transmission window, and wherein a beginning of the paging window is after an end of a first discovery window and an end of the paging window is before a beginning of a second discovery window.

2. The device of claim 1, wherein the data link group includes multiple devices of a neighbor aware network (NAN) or a wireless mesh network.

3. The device of claim 1, further comprising:
    a memory configured to store an active key set, one or more pairwise keys, a candidate key set, or a combination thereof, wherein the active key set includes an active group key, an active distribution key, an active group integrity key, or a combination thereof; and
    an encoder configured to encode the candidate group key to generate an encoded candidate group key, wherein the encoder is configured to encode the candidate group key based on the active group key, the active distribution key, or a particular pairwise key of the one or more pairwise keys.

4. The device of claim 1, wherein the wireless interface circuitry is configured to transmit, during a data window of the transmission window, the candidate group key to a second device of the data link group as a unicast message.

5. The device of claim 1, the processor further comprising message logic configured to generate a second multicast message that includes the candidate group key, the second multicast message comprising a public action frame or a data link group message, wherein the wireless interface circuitry is configured to transmit the second multicast message to the one or more devices.

6. The device of claim 1, wherein the wireless interface circuitry is further configured to receive a second announcement message from a particular device of the data link group after transmission of the announcement message, the second announcement message indicating a second candidate group key, and wherein the key logic is configured to:
    select the second candidate group key in response to a determination that the second candidate group key has a higher priority than the candidate group key; and
    after expiration of a first group key as an active group key, set the second candidate group key as the active group key.

7. The device of claim 6, wherein the key logic is configured to:
    determine a first priority of the candidate group key based on a first key indicator related to the candidate group key, wherein the first key indicator includes a medium access control (MAC) address, a hash value, a timestamp, or a combination thereof, wherein the hash value is generated based on the MAC address, the candidate group key, or both;
    determine a second priority of the second candidate group key based on a key indicator included in the second announcement message; and
    determine that the second candidate group key has a higher priority than the candidate group key based on a comparison of the first priority to the second priority.

8. The device of claim 1, wherein the wireless interface circuitry is further configured to transmit a key delivery message including the candidate group key, wherein the key delivery message includes a key identifier indicating an expiration time of the candidate group key, and wherein the key logic is configured to generate a second candidate group key prior to the expiration time.

9. The device of claim 1, wherein the candidate group key is included in a key delivery message, and wherein the key delivery message includes a key identification number, a key index, or both, wherein the key index indicates inactive group keys and an active group key, and wherein the key index enables devices of the data link group to determine the active group key.

10. The device of claim 1, the key logic further configured to select, from a plurality of candidate group keys, a particular candidate group key as a next active group key, the plurality of candidate group keys including the candidate group key.

11. A method for wireless communication, the method comprising:
    obtaining a candidate group key at a first device of a data link group; and
    transmitting, from the first device to a second device of the data link group, an announcement message indicating availability of the candidate group key, wherein the announcement message is transmitted during a paging window designated for the data link group, wherein the announcement message comprises a multicast message, wherein the paging window is part of a transmission window, and wherein a beginning of the paging window is after an end of a first discovery window and an end of the paging window is before a beginning of a second discovery window.

12. The method of claim 11, wherein the first device obtains the candidate group key by generating the candidate group key at the first device or by receiving the candidate group key at the first device from another device of the data link group, and wherein the candidate group key enables at least one of encryption or decryption of group addressed data messages corresponding to the data link group.

13. The method of claim 11, further comprising, prior to obtaining the candidate group key:
receiving a second announcement message from a third device of the data link group, wherein the second announcement message indicates that the candidate group key is available; and
sending a request corresponding to the data link group to request the candidate group key.

14. The method of claim 11, wherein the announcement message includes a key indicator, a data link group identifier of the data link group, a device identifier of a particular device that generated the candidate group key, or a combination thereof.

15. The method of claim 14, wherein the key indicator comprises a medium access control (MAC) address of the first device, a hash value, a timestamp corresponding to generation of the candidate group key, or a combination thereof, wherein the hash value is generated based on the MAC address, the candidate group key, or both, and wherein the device identifier includes a second MAC address of the particular device.

16. The method of claim 11, wherein the first device is associated with the second device when the first device transmits the announcement message, and further comprising:
receiving, at the first device from the second device, a request to send the candidate group key from the first device to the second device; and
sending the candidate group key from the first device to the second device after encrypting the candidate group key using a pairwise key, wherein the pairwise key enables secure communication between the first device and the second device.

17. The method of claim 11, further comprising:
after transmitting the announcement message, receiving a request for the first device to associate with the second device;
making a security association with the second device, wherein a pairwise key corresponding to the first device and the second device is generated during the security association; and
after completion of the security association, receiving a second request for the first device to send the candidate group key to the second device.

18. The method of claim 17, wherein the first device operates as a key generator device of the data link group, and wherein other devices of the data link group do not operate as key generator devices prior to the first device ceasing operation as the key generator device, and further comprising:
transmitting a message from the first device to the second device of the data link group, the message indicating the second device is to operate as the key generator device of the data link group;

terminating key generation operations at the first device; and
disassociating from the data link group by the first device, transitioning into a low power operating mode at the first device, or both.

19. A device for wireless communication, the device comprising:
a processor including key logic configured to monitor a first communication channel during a paging window designated for a data link group, wherein the paging window is part of a transmission window, and wherein a beginning of the paging window is after an end of a first discovery window and an end of the paging window is before a beginning of a second discovery window; and
wireless interface circuitry configured to receive an announcement message from a first device of the data link group during the paging window, the announcement message indicates availability of a candidate group key, wherein the announcement message comprises a multicast message.

20. The device of claim 19, wherein the wireless interface is further configured to receive a key delivery message including an encoded candidate group key, and further comprising:
a memory configured to store an active key set, one or more pairwise keys, a candidate key set, or a combination thereof, wherein the candidate key set includes the candidate group key, a candidate distribution key, a candidate group integrity key, or a combination thereof; and
a decoder configured to decode the encoded candidate group key to generate the candidate group key based on an active group key, an active distribution key, or a particular pairwise key of the one or more pairwise keys.

21. The device of claim 20, further comprising an encoder configured to encode the candidate group key to generate the encoded candidate group key, wherein the encoder is configured to encode the candidate group key based on the active group key, the active distribution key, or the particular pairwise key, and wherein the key logic is further configured to validate group addressed traffic based on an active integrity group key included in the active key set.

22. A method for wireless communication, the method comprising:
monitoring, at a second device of a data link group, a first communication channel during a paging window designated for the data link group, wherein the paging window is part of a transmission window, and wherein a beginning of the paging window is after an end of a first discovery window and an end of the paging window is before a beginning of a second discovery window; and
receiving an announcement message at the second device from a first device of the data link group during the paging window, the announcement message indicating availability of a candidate group key, wherein the announcement message comprises a multicast message.

23. The method of claim 22, further comprising obtaining the candidate group key, wherein obtaining the candidate group key comprises:
transmitting a trigger message to the first device in response to receiving the announcement message during the paging window; and receiving the candidate group key from the first device during a data window.

24. The method of claim 22, further comprising:
updating a counter, the counter related to an expiration of a prior group key; and
halting updating the counter in response to receiving the announcement message prior to the counter reaching a particular value, the particular value related to generation of a new group key by the second device.

25. The method of claim 22, further comprising:
identifying a first key indicator included in the announcement message;
receiving a second announcement message from a third device of the data link group during the paging window, the second announcement message including a second key indicator and indicating generation of a second candidate group key;
transmitting a trigger message to the first device based on the first key indicator of the announcement message having higher priority than the second key indicator; and
receiving the candidate group key from the first device.

26. The method of claim 22, further comprising:
prior to receiving the announcement message, initiating generation of a second candidate group key; and
in response to receiving the announcement message, stopping generation of the second candidate group key.

27. The method of claim 22, further comprising:
in response to receiving the announcement message, determining whether the second device is associated with the first device; and
in response to a determination that the first device is associated with the second device, requesting the candidate group key from the first device.

28. The method of claim 22, further comprising:
in response to receiving the announcement message, determining whether the second device is associated with the first device; and
in response to a determination that the second device is unassociated with the first device:
  identifying a third device of the data link group that has received the candidate group key and that is associated with the second device, wherein the third device is identified during a time period that ends prior to expiration of an active group key of the data link group, wherein the time period begins after the announcement message is received and ends at a predetermined time before the expiration of the active group key;
  requesting the candidate group key from the third device; and
  receiving the candidate group key from the third device prior to the expiration of the active group key.

29. The method of claim 28, further comprising:
performing a security association with the third device in response to a determination that the second device is unassociated with the first device, wherein the security association establishes a pairwise key;
receiving an encoded candidate group key from the third device;
decoding the encoded candidate group key based on the pairwise key to generate the candidate group key at the second device; and
storing the candidate group key at a memory.

30. The method of claim 22, further comprising, in response to a determination that the second device is unassociated with the first device:
identifying a predetermined time before expiration of an active group key of the data link group;
prior to the predetermined time, sending a multicast request for the candidate group key to at least one device of the data link group; and
receiving the candidate group key from a third device of the data link group responsive to the multicast request.

* * * * *